US008942999B1

(12) United States Patent
Fernando et al.

(10) Patent No.: US 8,942,999 B1
(45) Date of Patent: Jan. 27, 2015

(54) METHODS SYSTEMS AND COMPUTER PROGRAM PRODUCTS FOR ESTIMATING WHEN TAXPAYER WILL RECEIVE TAX REFUND

(71) Applicant: Intuit Inc., Mountain View, CA (US)

(72) Inventors: Jessica L. Fernando, San Diego, CA (US); Paul Bober, San Diego, CA (US); Joshua G. Tsuji, Aptos, CA (US); Akhil Pandey, San Diego, CA (US); Ganesh Bhat, San Diego, CA (US); Wensheng Mao, Andover, MA (US)

(73) Assignee: Intuit Inc., Mountain View, CA (US)

(*) Notice: Subject to any disclaimer, the term of this patent is extended or adjusted under 35 U.S.C. 154(b) by 0 days.

(21) Appl. No.: 13/725,779

(22) Filed: Dec. 21, 2012

(51) Int. Cl.
*G06F 17/22* (2006.01)
*G06Q 40/00* (2012.01)

(52) U.S. Cl.
CPC .................................. *G06Q 40/123* (2013.01)
USPC ........................................................... 705/31

(58) Field of Classification Search
CPC ................................................... G06Q 40/123
USPC ........................................................... 705/31
See application file for complete search history.

(56) References Cited

U.S. PATENT DOCUMENTS

| 7,769,647 | B1 * | 8/2010 | Char et al. ...................... 705/31 |
| 7,853,494 | B2 * | 12/2010 | Wyle ................................ 705/31 |
| 7,925,553 | B2 * | 4/2011 | Banks et al. .................... 705/31 |
| 8,015,083 | B1 * | 9/2011 | Sterling et al. ................. 705/31 |

OTHER PUBLICATIONS

"Tax Refund Status and IRS Refund Dates for 2012" http://www.efile.com/tax-refund/where-is-my-refund/ May 11, 2012.*
http://turbotax.intuit.com/support/iq/General-Product-Purchase/How-do-I-cancel-refund-transfer-/IAS10170.html.
http://turbotax.intuit.com/support/iq/Tax-Refund/Using-Refund-Processing-Services-to-Pay-TurboTax-Fees/GEN12098.html.
http://turbotax.intuit.com/support/iq/Tax-Refund/Finding-the-Refund-Processing-Service-option-in-TurboTax-Online/ GEN12826.html.
http://www.irs.gov/Refunds/Where's-My-Refund-It's-Quick,-Easy,-and-Secure.
http://www.irs.gov/Individuals/About—Where's-My-Refund%3F-.
http://www.irs.gov/Individuals/When-is-Where's-My-Refund-Available%3F.
https://sa2.www4.irs.gov/irfof/lang/en/irfofgetstatus.jsp.
http://www.igotmyrefund.com/.
http://web.archive.org/web/20121215023616/http://turbotax.intuit.com/tax-tools/tax-tips/IRS-Tax-Return/Where-s-My-Tax-Refund—The-IRS-Refund-Timetable-Explained/INF12152.html dated Dec. 15, 2012, printed Apr. 25, 2014 (2 pages).
http://web.archive.org/web/20110122150308/http://itunes.apple.com/us/app/mytaxrefund/id365180396 dated Jan. 22, 2012, printed Apr. 25, 2014 (6 pages).
http://web.archive.org/web/20111113180707/http://itunes.apple.com/us/app/mytaxrefund/id365180396 dated Nov. 13, 2011, printed Apr. 28, 2014 (4 pages).

(Continued)

*Primary Examiner* — Thomas M Hammond, III
(74) *Attorney, Agent, or Firm* — Vista IP Law Group LLP

(57) ABSTRACT

Methods, systems and computer program products for generating and presenting an estimate of when a taxpayer can expect to receive a tax refund.

30 Claims, 34 Drawing Sheets

(56) References Cited

OTHER PUBLICATIONS http://web.archive.org/web/20120114084830/http://itunes.apple.com/us/app/mytaxrefund/id365180396 dated Jan. 14, 2012, printed Apr. 28, 2014 (5 pages).
http://web.archive.org/web/20120114084830/http://itunes.apple.com/us/app/mytaxrefund/id365180396, printed Apr. 28, 2014 (3 pages).
https://play.google.com/store/apps/details?id=com.intuit.mobile.mytaxrefund, printed Apr. 25, 2014 (2 pages).
http://web.archive.org/web/20120515010624/https://play.google.com/store/apps/details?id=com.intuit.mobile.mytaxrefund dated May 15, 2012, printed Apr. 28, 2014 (2 pages).
http://web.archive.org/web/20121220194640/https://play.google.com/store/apps/details?id=com.intuit.mobile.mytaxrefund dated Dec. 20, 2012, printed Apr. 28, 2014 (2 pages).
http://web.archive.org/web/20121220135918/https://play.google.com/store/apps/details?id=com.intuit.mobile.mytaxrefund dated Dec. 20, 2012, printed Apr. 28, 2014 (2 pages).
http://web.archive.org/web/20121220033659/https://play.google.com/store/apps/details?id=com.intuit.mobile.mytaxrefund dated Dec. 20, 2012, printed Apr. 28, 2014 (2 pages).
https://ttlc.intuit.com/questions/1900969-what-is-mytaxrefund, printed Apr. 28, 2014 (3 pages).
https://ttlc.intuit.com/questions/1894389-when-will-i-get-my-tax-refund, printed Apr. 28, 2014 (4 pages).
http://www.irs.gov/Refunds/, printed Apr. 28, 2014 (1 page).
https://itunes.apple.com/us/app/mytaxrefund/id365180396#, printed Apr. 28, 2014 (3 pages).
http://www.best10apps.com/apps/mytaxrefund,365180396/, printed Apr. 28, 2014 (6 pages).
App Store—MyTaxRefund-screen-shot-wayback.htm dated Nov. 13, 2011, printed Apr. 28, 2014 (6 pages).

* cited by examiner

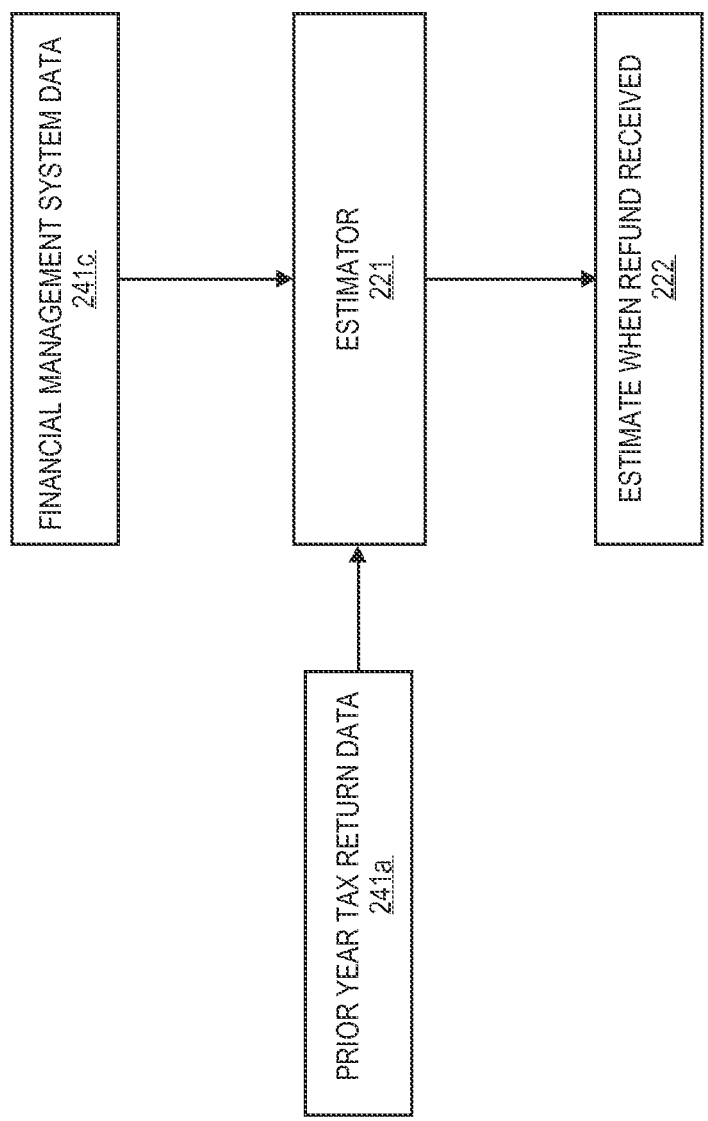

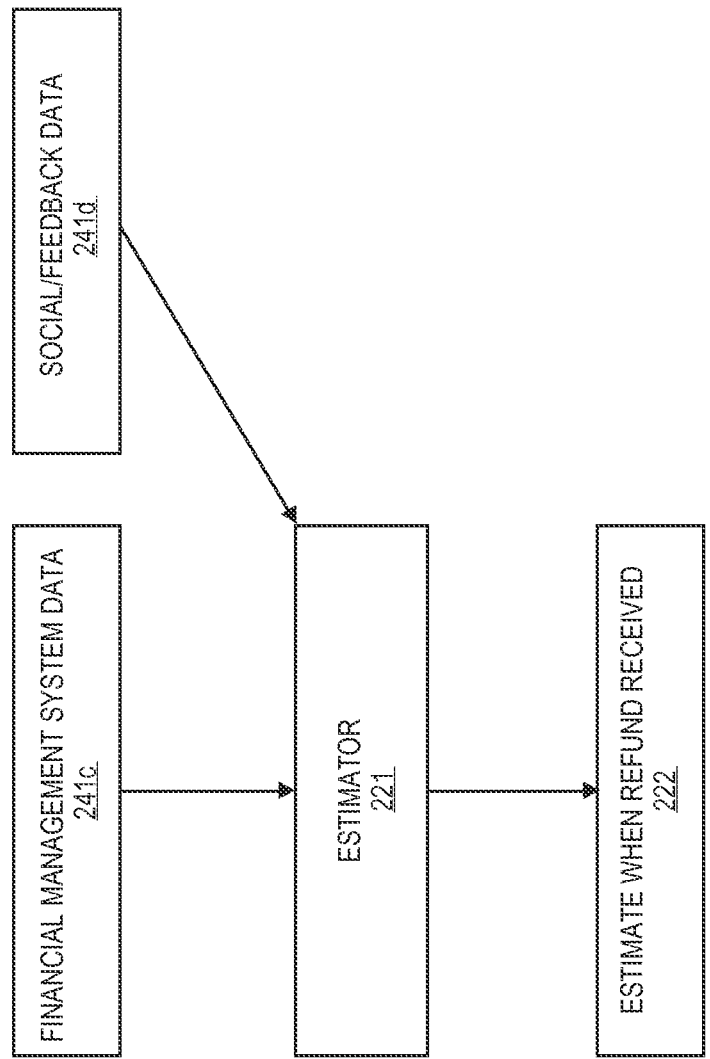

PRIOR YEAR TAX RETURN DATA 241a

| Taxpayer ID 702a | Filing Date Data 702b | Refund Receipt Data 702c | Refund Wait Data 702d |
|---|---|---|---|
| ID 1 | Filing Date 1 | Refund Date 1 | Wait 1 |
| ID 2 | Filing Date 2 | Refund Date 2 | Wait 2 |
| ID 3 | Filing Date 3 | Refund Date 3 | Wait 3 |
| ID 4 | Filing Date 4 | Refund Date 4 | Wait 4 |

FIG. 7A

CURRENT YEAR TAX RETURN DATA 241b

| Taxpayer ID 712a | Filing Date Data 712b | Refund Received? 712c | Refund Receipt Data 712d | Refund Wait Data 712e |
|---|---|---|---|---|
| ID 1 | Filing Date 1 | Y | Refund Date 1 | Wait 1 |
| ID 2 | Filing Date 2 | N | | Wait 2 |
| ID 3 | Filing Date 3 | N | | Wait 3 |
| ID 4 | Filing Date 4 | Y | Refund Date 4 | Wait 4 |

METHODS SYSTEMS AND COMPUTER PROGRAM PRODUCTS FOR ESTIMATING WHEN TAXPAYER WILL RECEIVE TAX REFUND

SUMMARY

Embodiments are directed to estimating when a taxpayer will receive a refund. For example, after a taxpayer files an electronic tax return with a tax authority utilizing a tax preparation application, the taxpayer can log into the account to check the status of the taxpayer's tax refund and is presented with one or multiple estimates of when to expect the tax refund. The tax preparation application can display the one or more estimates or send an electronic message to the taxpayer with the one or more estimates, which may include a time from a current date, a particular date or range of dates. The taxpayer can also receive updates regarding when the estimate has changed or been updated.

One embodiment is directed to a computer-implemented method for estimating when a taxpayer will receive a tax refund and comprises generating and electronically filing an electronic tax return of the taxpayer with a tax authority. The electronic tax return is generated by a tax preparation application and indicates that the taxpayer will receive a refund from the tax authority. The method further comprises receiving first and second data of respective different first and second types and/or from different sources, and processing or transforming the first and second data into an expected wait time or estimate of when the taxpayer can expect to receive the refund.

A further embodiment is directed to a computer-implemented method for estimating when a taxpayer will receive a tax refund and comprises generating and electronically filing an electronic tax return of the taxpayer with a tax authority. The electronic tax return is prepared with a tax preparation application and indicates that the taxpayer is entitled to a refund from the tax authority. The method further comprises requesting feedback from respective other taxpayers or users of the tax preparation application regarding whether those other taxpayers or users have received their respective refunds, e.g., through a survey or question and answer session presented through the tax preparation application, and receiving respective feedback from respective other taxpayers or users through the tax preparation application. The method further comprises processing or transforming that feedback data by other taxpayers or users into an expected wait time or estimate when the subject taxpayer can expect to receive the refund. The estimate may be based on feedback from current year taxpayers for current year tax returns, feedback from prior year taxpayers regarding prior year tax returns, or a combination thereof.

Yet another embodiment is directed to a computer-implemented method for estimating when a taxpayer will receive a tax refund and comprises generating and electronically filing an electronic tax return of the taxpayer with a tax authority. The electronic tax return indicates that the taxpayer is entitled to a refund from the tax authority. The method further comprises receiving or accessing data of a financial management system utilized by at least one other taxpayer. The financial management system is in communication with one or more financial institutions at which the at least one other taxpayer has respective one or more accounts including a designated account for receiving an electronic deposit from the tax authority. The financial management system data, e.g., electronic deposit data, indicates when the tax refund of the other taxpayer was electronically deposited into the designated account. The data received from the financial management system may be in the form of a date (date of electronic deposit) or more detailed transaction or line item or deposit information of an account accessed by the financial management system, which is then analyzed or parsed to determine when the refund was deposited. An estimate of when the subject taxpayer is expected to receive a refund is generated based at least in part upon the received financial management system data. The estimate may be based on financial management system data of current year taxpayers for current year tax returns and electronic deposits, financial management system data for prior year taxpayers for prior year tax returns and electronic deposits, or a combination thereof.

Yet a further embodiment is directed to a computer-implemented method for estimating when a taxpayer will receive a tax refund and comprises analyzing prior year tax return data, determining the filing or acceptance dates of prior year tax returns, and determining when refunds for those prior year tax returns were received. The method further comprises estimating the number of days from the filing or acceptance date that it took for a pre-determined or selected X % of the prior year taxpayers to receive their refunds. This number of days is utilized to generate an estimate of when a current year taxpayer is expected to receive a refund, and may be presented together with the underlying statistical data or confidence indicator, e.g., a message indicating that in the past, X % of people received their refunds within Y days.

Further embodiments are directed to distributing generated estimates or making the generated estimates available to taxpayers, including users and non-users of the tax preparation application. For example, the generated estimate may be sent as an electronic message to a user of the tax preparation application or otherwise made available on a website that can be accessed by users as well as non-users or taxpayers that utilize other tax preparation programs. As another example, given the estimates generated for tax refunds filed or accepted on a particular date, users of the tax preparation application (and non-users in certain embodiments) can access a website, enter the filing or acceptance date of their tax return, and embodiments may provide a generated estimate in the form of a wait time from a current date or a date or range of dates when a refund can be expected, based on that entered filing or acceptance date.

Other embodiments are directed to systems involving or comprising an intermediate or host computer in communication with and between end user computers or computing/communication devices, and a computer of a tax authority, and a tax preparation application hosted or managed by the intermediate computer and configured or operable to generate an estimate of when a taxpayer will receive a tax refund. The estimate may be in the form of a wait time from a current date, a particular date, or a range of dates.

Yet other embodiments are directed to computer program products or articles of manufacture comprising a non-transitory computer readable medium comprising instructions which, when executed by a computer, perform a process for generating an estimate of when a taxpayer can expect to receive a refund according to embodiments.

In a single or multiple embodiments, the estimated date or range of dates during which the taxpayer can expect to receive the refund is based on or derived from or the result of transformation of data that is managed, hosted or accessible by the computer. The computer may be an intermediate computer hosting, accessing or executing the tax preparation application. The source of the data utilized to generate the estimate is external relative to the tax preparation application. Examples of external data sources include a tax authority, a FMS that aggregates account or transaction data from various user accounts, and other users or taxpayers themselves or associated data stores, e.g., in the form of input or feedback from users of the tax preparation application stored to a data store. Further, the data may involve prior year and/or current year tax return filing, acceptance and refund data.

In one embodiment, the estimate of when a taxpayer may receive a refund is generated according to a weighting or factor function in which a first weighted value or factor is assigned to a first type data and a second weighting value or factor is assigned to another, second type of data that is different than the first type of data. The estimate of when a taxpayer may receive the refund is generated based at least in part upon the first and second weighted values.

For example, a weighting function may emphasize or assign greater weight to feedback from other taxpayers or users of the tax preparation application confirming whether or when they have receive their refunds for a current tax year, whereas less emphasis or weight may be applied to such data from prior tax years. As another example, if a tax authority, e.g., through a notification or bulletin transmitted to hosts of tax preparation applications or posted to a tax authority website, indicates that processing of all tax returns is delayed, such delays or other tax authority notifications regarding tax return or refund processing can be factored into the weighting function and generated estimate. Further, an estimate of when a taxpayer can expect to receive a refund generated by the tax authority may be factored into the generated estimate, or utilized for comparison relative to the generated estimate so that the taxpayer can view both the estimate generated according to embodiments and an estimate provided by the tax authority. Thus, estimates in the form of waiting times, dates or ranges of dates can be generated independently and separately of tax authority estimates, or tax authority estimates may be one of multiple factors considered by embodiments.

In one embodiment, the estimate is generated based at least in part upon different types and combinations of data. One such combination is prior tax year and current tax year data. In one embodiment, if it is determined that a current tax year wait time deviates from a prior tax year wait time, or deviates by a certain amount, the estimate that is generated accounts for that deviation or current tax year trend compared to prior tax year wait times. For example, if it is determined that current tax year refunds are taking more time to process than a prior year, this resulting estimate can account for this difference or deviation, and embodiments may be configured to select a more conservative or delayed estimate based at least in part upon this factor.

In a single or multiple embodiments, an estimate generated by the tax authority is one of multiple factors in the resulting generated estimate. In other embodiments, tax authority estimates may be received and displayed together with the generated estimate for purposes of comparison or reference. For example, a tax authority may estimate that a tax refund will be received within 21 days of receipt of the electronic tax return, and an estimate generated according to embodiments may identify a particular week or a few days. The generated estimate may or may not overlap with the tax authority estimate. Embodiments may involve factoring the tax authority estimate into the generated estimate, or the generated estimate may be generated independently of, or without reference to, the tax authority estimate.

In a single or multiple embodiments, a tax refund estimate generated according to embodiments is based at least in part upon first data comprising prior year tax data or how long taxpayers had to wait to receive their prior tax year refunds, and second data comprising feedback from other users of the tax preparation application indicating when the other users received their respective refunds. For example, other users may log into their accounts of the tax preparation application, which then presents a survey, questions or request for feedback to the users. The survey or question responses or answers are then processed or factored into the generated estimate for a subject taxpayer.

In a single or multiple embodiments, the refund estimate is generated utilizing data of electronic tax returns of other taxpayers that were filed by a tax preparation application and refunds for which that were routed or processed through the intermediate computer hosting the tax preparation application.

For example, a refund may be transmitted from the tax authority computer to an intermediate computer, which transmits or distributes the refund to the taxpayer in the form of an electronic transfer or deposit or in the form of a payment card credited with an amount of the refund amount. In this manner, the tax preparation application can process and monitor refund distributions and aggregate or collect tax return data of multiple taxpayers or users for multiple years such that prior and current year tax return data can be analyzed to determine refund estimates for a current tax year, as well as future tax years. In a single or multiple embodiments, other taxpayers may receive direct deposits from the tax authority into a designated account such as a designated checking account of the other taxpayer at a bank. The computer can receive feedback or input from these direct deposit users to the computer indicating whether or when their tax refunds have been received. This data is utilized to determine an estimate for when a subject taxpayer can expect to receive a refund. Thus, embodiments may involve processing of refunds through the intermediate computer, data hosted, accessed or received by the intermediate computer, and/or direct deposit from the tax authority to a designated taxpayer account.

In a single or multiple embodiments, after a tax refund estimate has been generated for a particular or subject taxpayer, that estimate can be added to other stored or aggregated estimates, and a first or prior estimate can be updated or changed as more data is aggregated and analyzed. Estimate updates or changes can be provided to other taxpayers that are waiting for their respective refunds. Thus, embodiments provide for dynamic tax refund estimate that can be updated based on current data of when other taxpayers receive their refunds, thus keeping other taxpayers that are still waiting for their refunds more informed about how long they can be expected to wait given current refund processing trends.

BRIEF DESCRIPTION OF THE DRAWINGS

The foregoing and other aspects of embodiments are described in further detail with reference to the accompanying drawings, wherein:

FIGS. 5A-M illustrate further examples of how embodiments may be implemented to generate an estimate of when a taxpayer can expect to receive a tax refund based on different types and combinations of data;

FIGS. 7A-B illustrate tables including prior and current year tax data utilized to generate an estimate of when a taxpayer can expect to receive a tax refund according to embodiments;

FIGS. 12A-H are screen shots generated by a tax preparation application illustrating how embodiments may be implemented.

DETAILED DESCRIPTION OF ILLUSTRATED EMBODIMENTS

Embodiments are related to providing an estimate to a taxpayer of when the taxpayer can expect to receive a refund from a tax authority. The estimate may be in the form of a wait time from a current date, a particular date or range of dates. The generated estimate may be the only estimate that is displayed or presented to the taxpayer, or the generated estimate can be displayed or presented with an estimate of a tax authority (or other third party estimate if accessible) so that the taxpayer can view multiple estimates for comparison.

According to one embodiment, a tax preparation program, or an estimator program that is a component, part, program or module thereof, or executed by or with the tax preparation program, receives or aggregates different types of data or data from different sources and performs an analysis of the received data to generate, derive or transform such data into an estimate of when a taxpayer may receive the tax refund.

Figure 1:
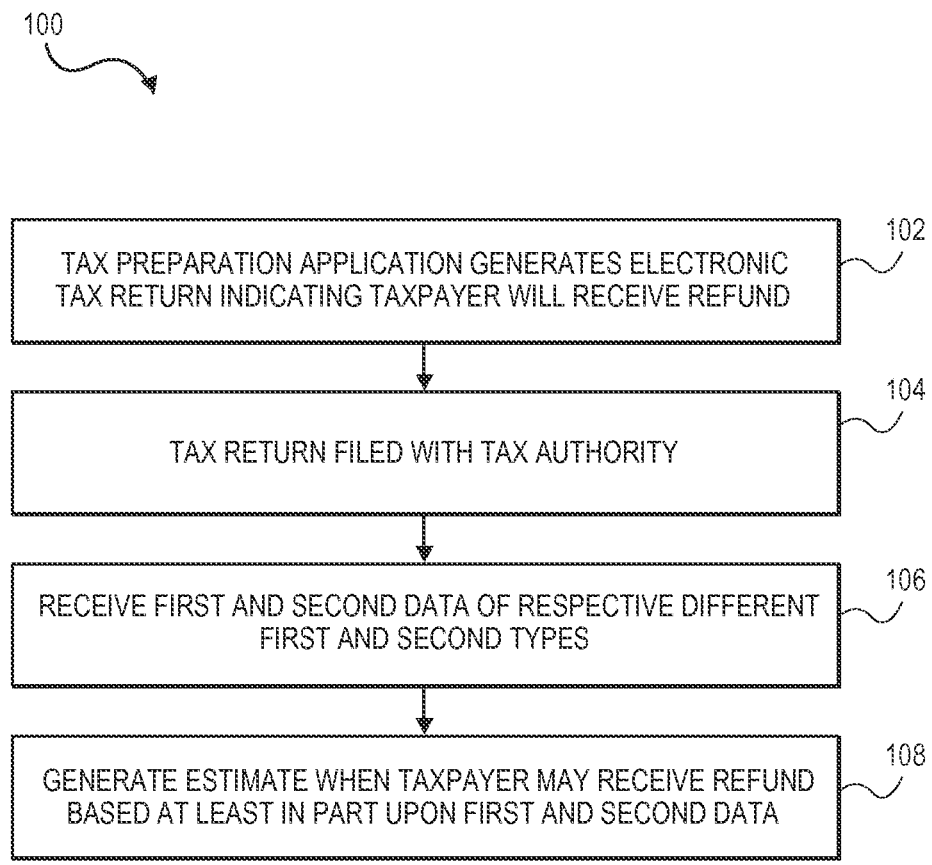
FIG. 1 illustrates a method for generating an estimate of when a taxpayer can expect to receive a tax refund according to embodiments.

Referring to FIG. 1, one embodiment of a method 100 for generating a refund of when a taxpayer may receive a tax refund involves or comprises, at 102, the tax preparation application being executed to generate or prepare an electronic tax return that indicates the taxpayer will receive refund. At 104, the electronic tax refund is filed with and accepted by a tax authority. In contrast to known tax preparation applications, embodiments provide post-filing or post-acceptance support to the taxpayer regarding the taxpayer's refund. At 106, the computer receives first and second (or additional) data of different types or data types, sources and combinations and generates an estimate when the taxpayer can expect to receive the refund based at least in part upon the different data types. Further aspects of embodiments are described with reference to FIGS. 2A-13.

Figure 2A:
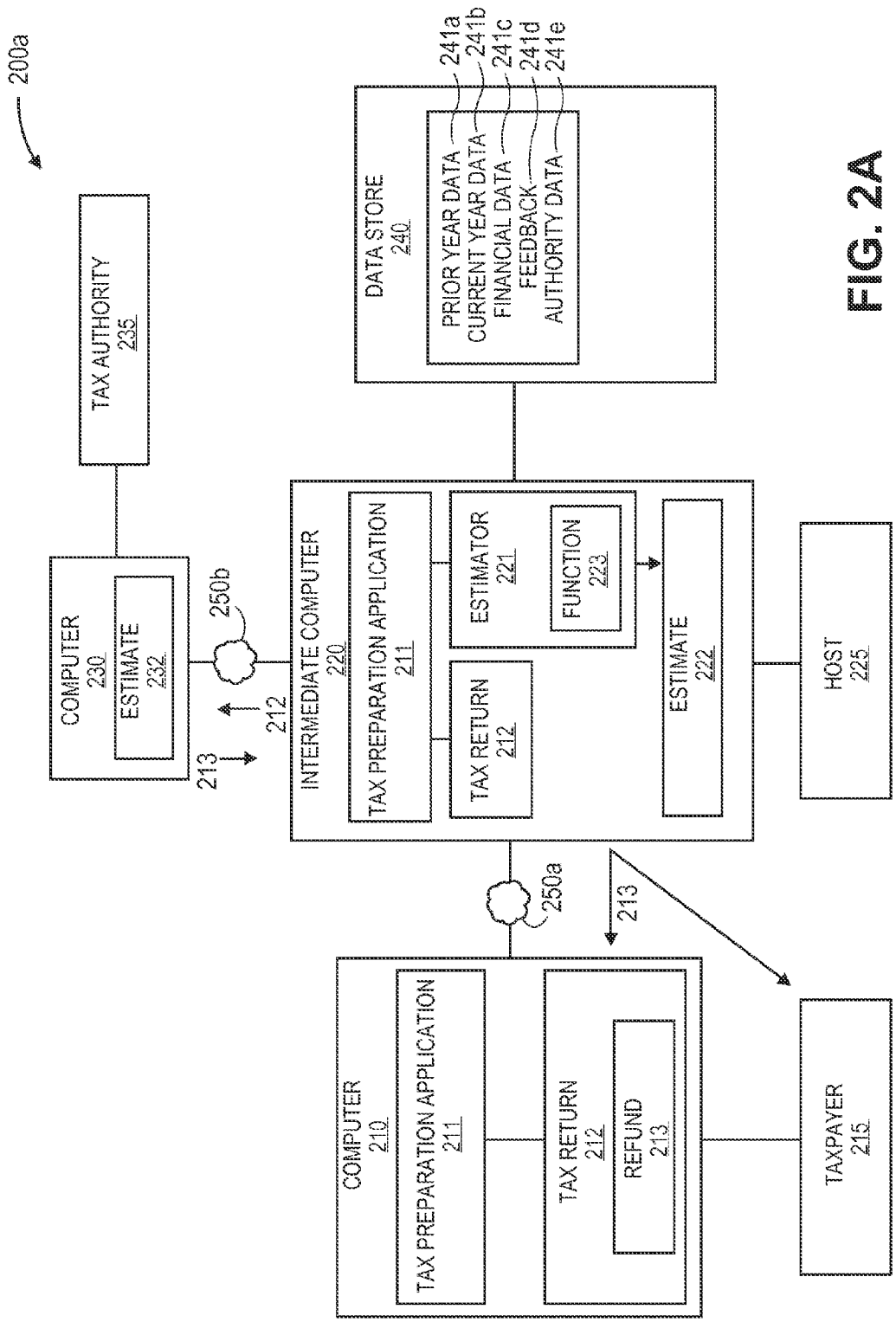
FIGS. 2A-C illustrate block diagrams of systems constructed according to embodiments for receiving or acquiring data and generating an estimate of when a taxpayer can expect to receive a refund, FIG. 2A illustrating processing of a refund through an intermediate computer or host of a tax preparation application, FIG. 2B illustrating processing of a refund by direct deposit into a designated taxpayer account, and FIG. 2C illustrating a tax preparation application being in communication with a financial management system.
Figure 2B:
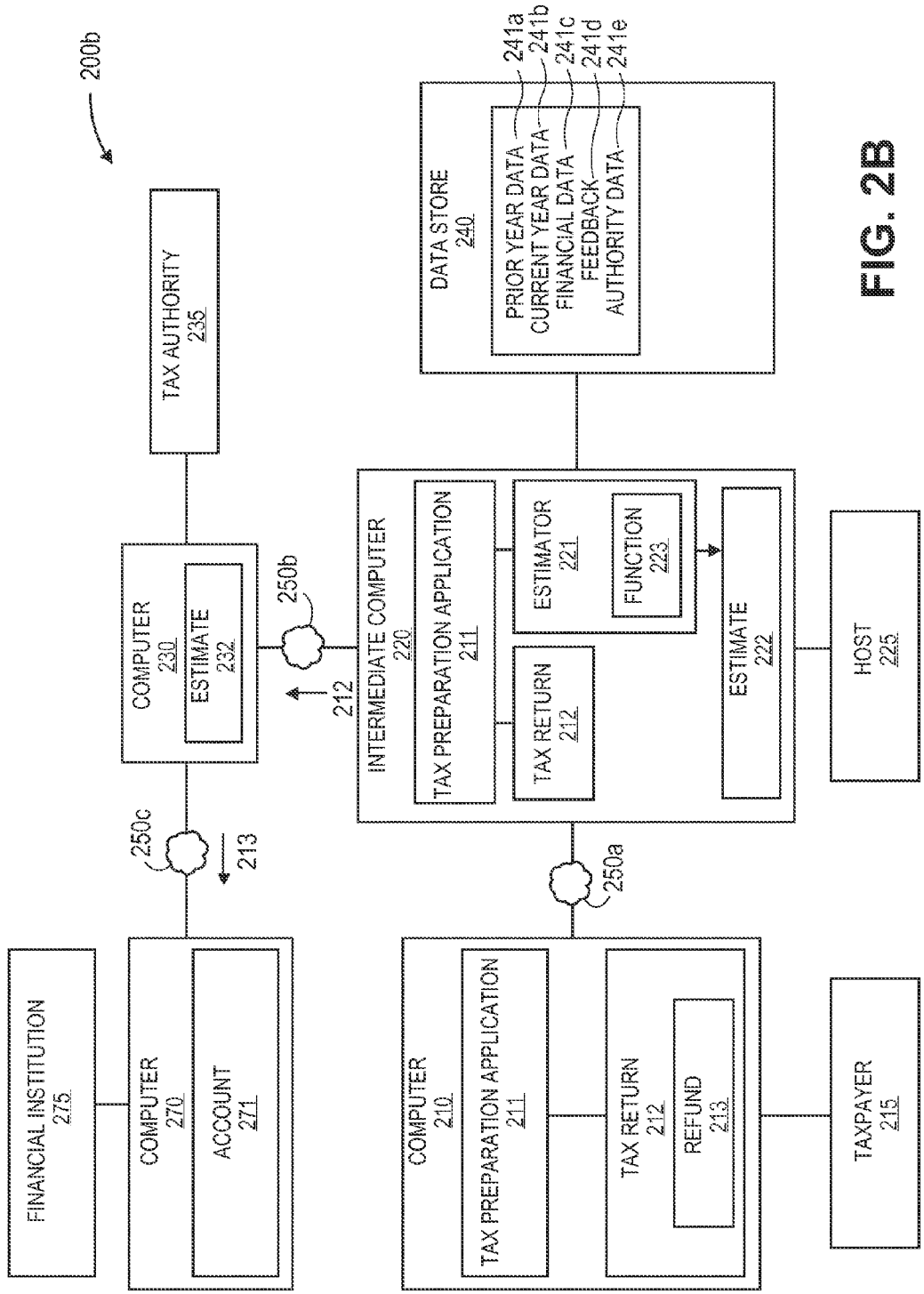
Figure 2C:
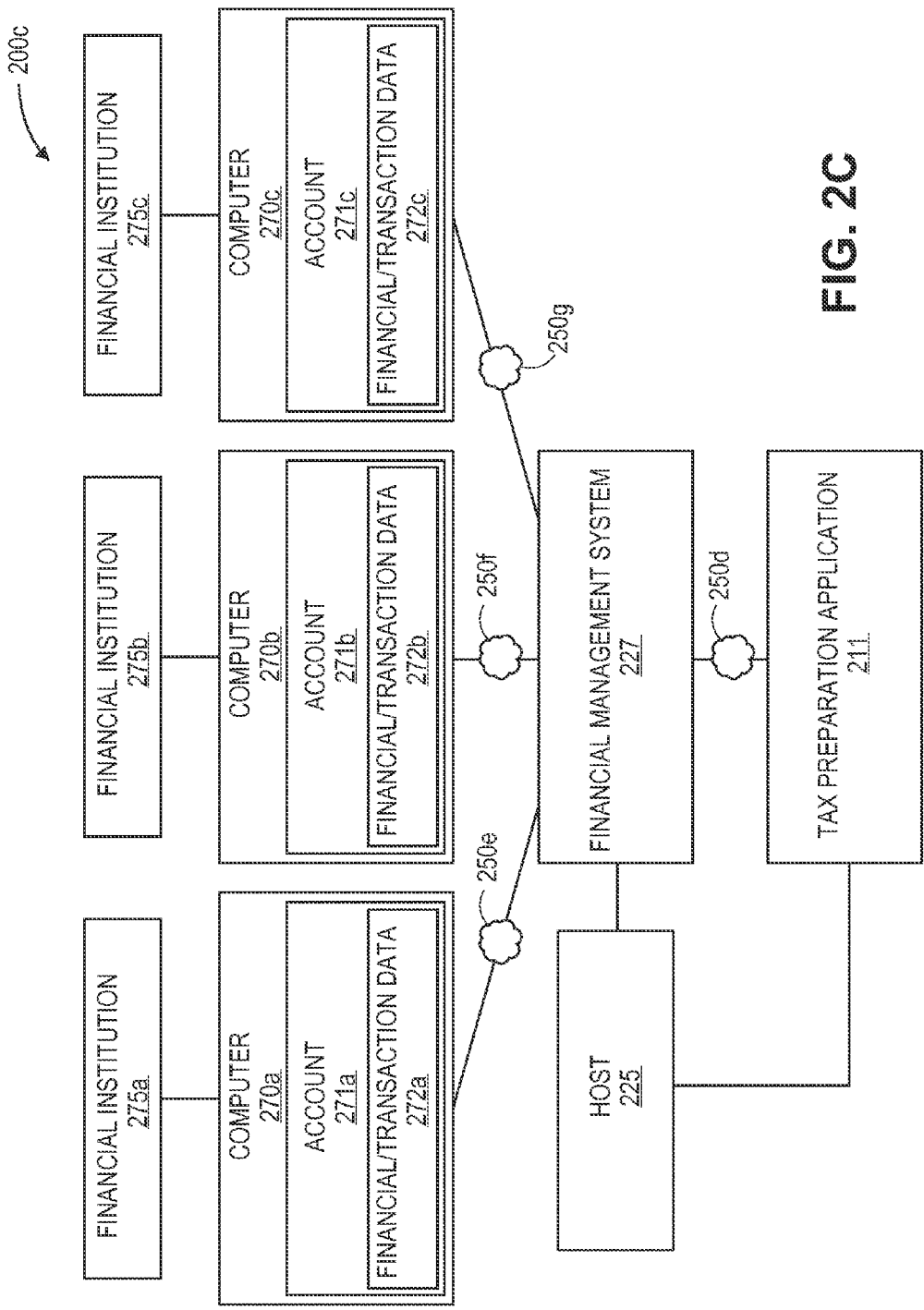

FIGS. 2A-C illustrate embodiments of systems or components thereof that are utilized or involved in execution of methods according to embodiments. Aspects of system components, their functionality and inter-operability are described, and further details regarding how these systems and components thereof can be utilized to implement method embodiments are described with reference to FIGS. 3-13.

Referring to FIG. 2A, a system 200a constructed according to one embodiment comprises or involves a computer, computing device or communication device 210 (generally, computer 210) of a user, taxpayer or refund recipient 215 (generally, taxpayer 215), one or more intermediate computers 220 (one intermediate computer 220 is illustrated for ease of explanation) of one or more hosts 215, a computer 230 of a tax authority 235, and a data store or database 240 (generally, data store 240) accessible by the intermediate computer 230. The taxpayer computer 210 is in communication through a network 250a with the intermediate computer 220, which may also be an electronic filing server operable to electronically file tax returns with the tax authority computer 230 and is in communication through a network 250b with the tax authority computer 230. The intermediate computer 220 includes, hosts or accesses through a network 250c, the data store 240 including data that may be processed according to embodiments in order to derive an estimate of when the taxpayer 215 will receive a tax refund.

Each of the networks 250a-c and other networks discussed herein (generally network 250) may be different, or two or more networks 250 may be the same depending on the system configuration and communication protocols employed. One or more or all of the networks 250 may be, for example, a cellular network, a wireless network, a Local Area Network (LAN) and/or a Wide Area Network (WAN) or a combination of two or more networks. Reference to a network 250 generally is not intended to refer to a specific network or communications protocol, and it should be understood that embodiments can be implemented using various networks and combinations thereof.

Reference is made generally to a taxpayer 215, but it will be understood that taxpayer 215 may be the actual taxpayer, tax refund recipient, user of a tax preparation application 211, or person or entity for which an electronic tax return 212 is prepared. The taxpayer's computer 210, which may be a desktop or laptop computer or other computing or communication device such as a tablet computing or communication device or other mobile communication device such as a smartphone (generally, computer 210) executes a tax preparation application 211 or a browser to access an on-line version of the tax preparation application 211 managed by the intermediate computer 220. The taxpayer 215 executes the tax preparation application 211 to navigate interview screens and enter or import tax data from an electronic file or source into the interview screen fields, to eventually complete the electronic tax return 212. The intermediate computer 220, or another intermediate computer serving as an electronic filing server or clearing house, formats and electronically files the completed electronic tax return 211 with the tax authority computer 230. The intermediate computer 220 or processes acknowledgements and other data received from the tax authority 235 and routes related information back to the taxpayer computer 210. One example of an intermediate computer 220 or electronic filing server that may be utilized for these purposes is an electronic filing server of Intuit Inc., Mountain View, Calif.

For purposes of this application, a tax preparation application 211 is defined as a computer program product, or system, that is used solely for preparing a tax or information return or other tax filing, and that may be operable to record, transmit, transfer and organize data related to such tax filings, and that are directed to solely enabling taxpayers 215 to file income tax returns or assisting them with managing their finances or tax-related matters. Examples of tax preparation applications 211 include consumer and professional tax preparation applications 215 available from Intuit Inc., Mountain View, Calif. It should be understood that embodiments may utilize or be incorporated into other tax preparation applications 211.

The tax authority 235 with which tax returns 212 are filed may be a federal tax authority such as the Internal Revenue Service (IRS), a state tax authority such as the State Franchise Board of California or other tax collecting entity to which taxes are paid. For ease of explanation, reference is made generally to a tax authority 235, and examples involve the IRS, but it will be understood that tax authority 235 refers to various tax collecting entities, including local, state and federal tax collecting entities, and embodiments may apply to generate estimates of when a taxpayer can expect to receive refunds from one or more or all of local, state and federal tax authorities.

As shown in FIG. 2A, the intermediate computer 220 stores or has access to electronic tax returns 211 or data thereof of taxpayers 215 utilizing the intermediate computer 220 to prepare or file their respective electronic tax returns 212. Such data may be stored on the intermediate computer 220, in the data store 240. As discussed in further detail below, the stored data 240 may include one or more types of data from one or more different sources and may include one or more or all of prior year tax return data 241a of prior year taxpayers that have already filed their prior year returns and received their prior year refunds, current year tax return data 241b of current year taxpayers that have filed their current year refunds and/or have either already received their refunds or are waiting for their refunds, financial management system (FMS) data 241c, social or feedback data 241d provided by taxpayers regarding indicating whether or when they have received their refunds, and tax authority data 241e that may impact when a taxpayer 215 will receive the refund 213.

With continuing reference to FIGS. 2A-B, after the tax authority 235 accepts and processes the filed electronic tax return 212, a refund 213 is provided to the taxpayer 215. The refund 213 may be provided to the taxpayer 215 by mail, through the intermediate computer or host 220 or through a financial institution computer.

For example, as shown in FIG. 2A, the intermediate computer 220 may receive funds of the refund from the tax authority 235, and distribute refund funds to the taxpayer 215 in the form of a card, such as a debit card or gift card, credited with an amount of the refund 213. The credited amount may be the entire refund amount or the refund amount minus a fee. As shown in FIG. 2B, the refund 213 may also be provided to the taxpayer 215 by direct deposit from the tax authority computer 230 through a network 250c to a computer 270 of a financial institution (FI) 275 and into a designated account 271 of the taxpayer 215 at the FI 275. Refund 223 processing may also involve another intermediate computer (e.g., of another FI or host) in communication with the intermediate computer 220 (one intermediate computer 220 is shown in FIG. 2B). The other intermediate computer may host a temporary account for receiving the refund 213 via direct deposit from the tax authority 235, pay any fees that may be due to the host 225 such as the cost of the tax preparation application 221 utilized to prepare and file the electronic tax return 212, and distribute the remaining refund amount to the taxpayer 215 by mail, direct deposit into the taxpayer's account 271 or debit card as discussed above.

Referring to FIG. 2C, the intermediate computer 220 may also host or be in communication with a financial management system (FMS) 227 through a network 250d. In the illustrated example, the taxpayer 215 and/or other taxpayers or users may have an account or sign up with the FMS 227 by providing information of one or multiple accounts 271a-c (generally, 271) they have at one or more FIs 275a-c (generally, 275) to the FMS 227. Embodiments may involve checking or savings accounts that can be designated as receiving a tax refund 213. The FMS 227 is linked to or can access or receive financial and/or transaction data 272a-c (generally, 272) of these accounts 271 through respective networks 250e-g. The FMS 227 aggregates financial and/or transaction data 272 of the identified accounts 271 and aggregated data may include account and line or item level transaction data for purchases, deposits, payments withdraws such as amounts and dates thereof.

While FIG. 2C illustrates the FMS 227 as being managed by the same host 225, embodiments are not so limited. Further, while the FMS 227 is shown as separate from the intermediate computer 220, the host 225 may manage both the tax preparation program 211 and the FMS 227. Moreover, it will be understood that the FMS 227 may be in communication with a single FI computer 270 to monitor or receive data of multiple accounts 271 of a particular taxpayer 215 at a particular FI 275, or monitor or receive data of multiple accounts 271 the taxpayer 215 has at respective FIs 275. Further, embodiments may involve multiple taxpayers 215.

The term financial management system or FMS 227 as described herein is defined as being a system utilizes solely for financial management, and includes to include, any computing system implemented, on-line or web-based, system, package, program, module, or application that gathers financial data, used solely for financial management and that has the capability to receive or retrieve financial data including electronic transaction, account and balance data, analyze and categorize at least part of the data into various reports or displays that are provided to the user or taxpayer 215, and provides the user or taxpayer 215 with the capability to conduct, and/or monitor, financial transactions. Specific examples of a FMS 227 that may be utilized to implement embodiments include, but are not limited to, those available from Intuit Inc. of Mountain View, Calif.

With continuing reference to FIGS. 2A-C, the intermediate computer 220 hosts, or the tax preparation application 211 includes, accesses or executes, a refund analyzer or estimator, program or module 221 (generally, estimator 221) that is operable to analyze different types of received, accessed or stored data 241 and analyze, process and transform the data 241 into an estimate 222 of when the taxpayer 215 can expect to receive the refund 213 based at least in part upon an estimation function (generally, function 223). Having described system components, their capabilities and how they may operate and communicate with each other, further aspects of how embodiments may be implemented with the system components shown in FIGS. 2A-C are described in further detail with reference to FIGS. 3-13.

Figure 3:
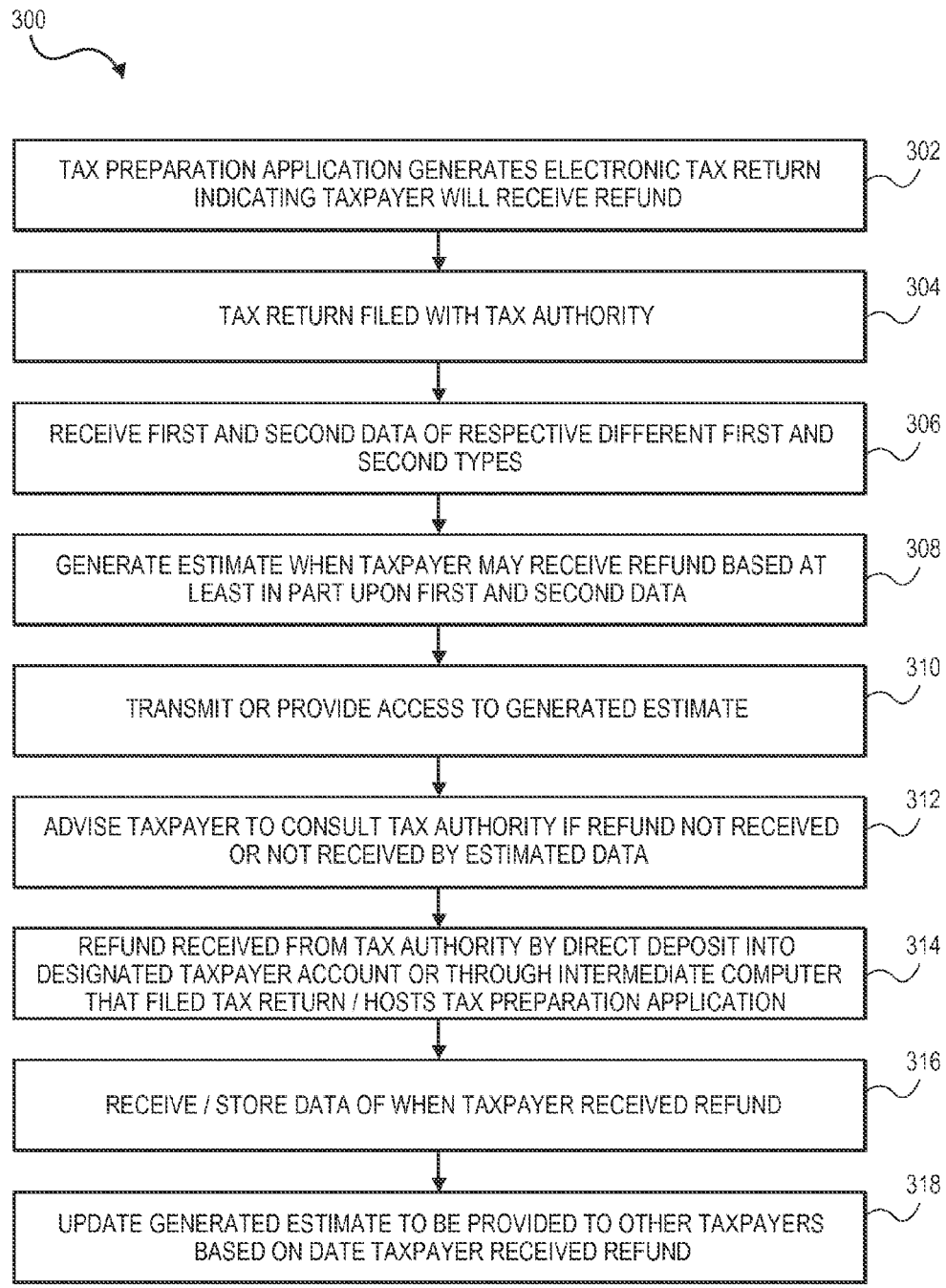
FIG. 3 illustrates a method for generating an estimate of when a taxpayer can expect to receive a tax refund and presenting the generated estimate to a taxpayer according to one embodiment.

Referring to FIG. 3, a method 300 for generating an estimate 222 of when a taxpayer 215 can expect to receive a refund 213 according to one embodiment involves or comprises, at 302, the taxpayer 215 executing or accessing the tax preparation 211 to generate an electronic tax return 212. The tax preparation application 211 may be utilized to generate an electronic tax return 212 for one tax authority 235 or multiple electronic tax returns 211 for multiple tax authorities 235 (e.g., state and federal tax returns). For ease of explanation, reference is made to an electronic tax return 212 such as a federal tax return to be filed with a tax authority 235 (IRS), and the electronic tax return 212 indicating that the taxpayer 215 will receive a refund 213 from the tax authority 235.

At 304, the intermediate computer 220 that serves as an electronic filing server or clearing house or other electronic filing server formats and electronically files the electronic tax return 212 with the tax authority 235, and process filing confirmations as necessary. At 306, the tax preparation application 220 or estimator 221 module or program thereof undertakes an analysis of different types of data of different sources in order to derive or generate an estimate 222 of when the refund 213 will be received at 308.

Figure 4:
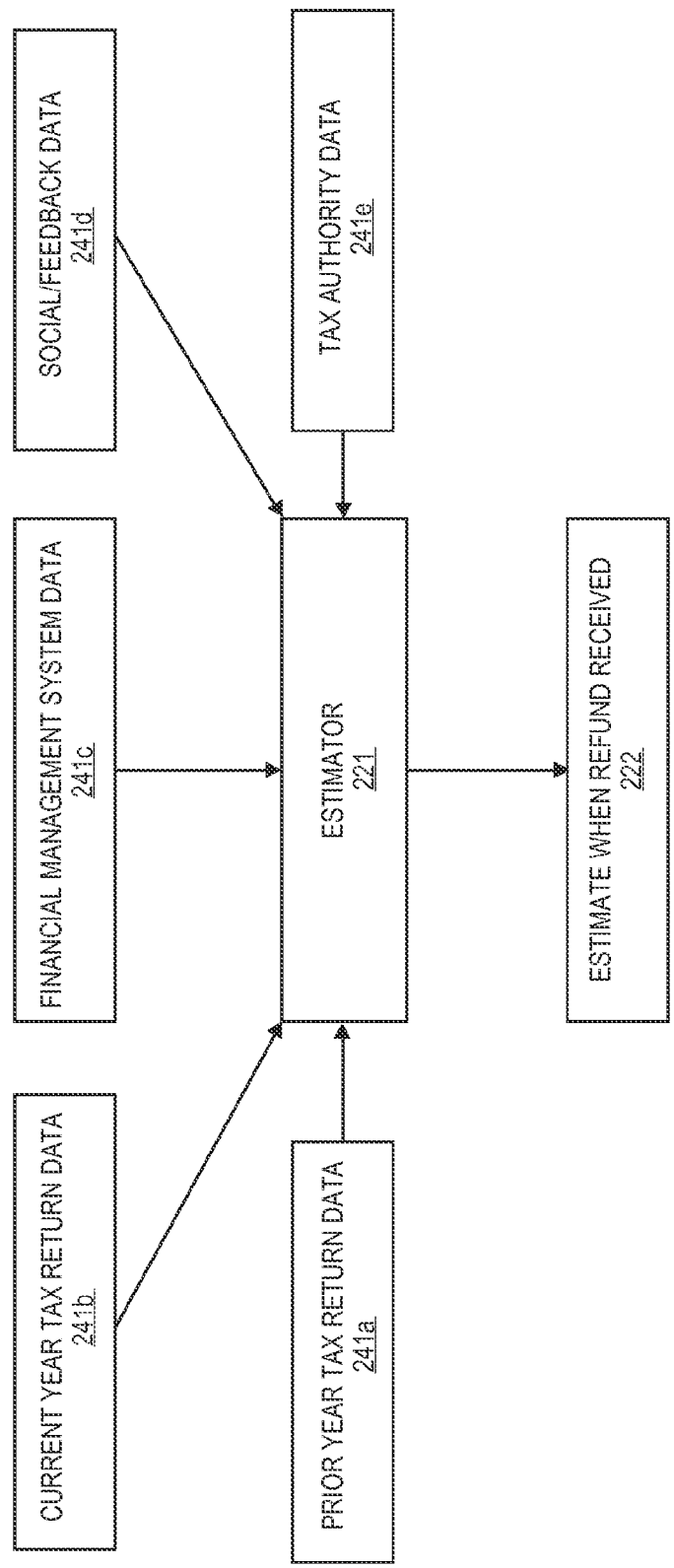
FIG. 4 illustrate different types of data that may be utilized individually or in combination to generate an estimate of when a taxpayer can expect to receive a tax refund according to embodiments.
Figure 5A:
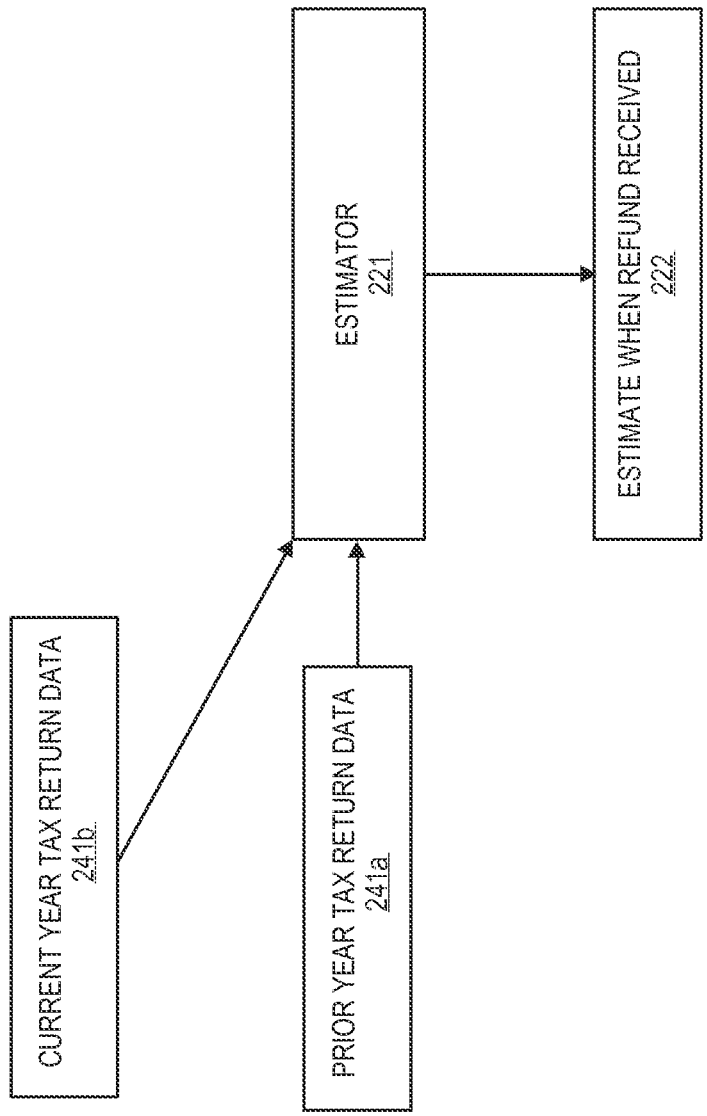
Figure 5C:
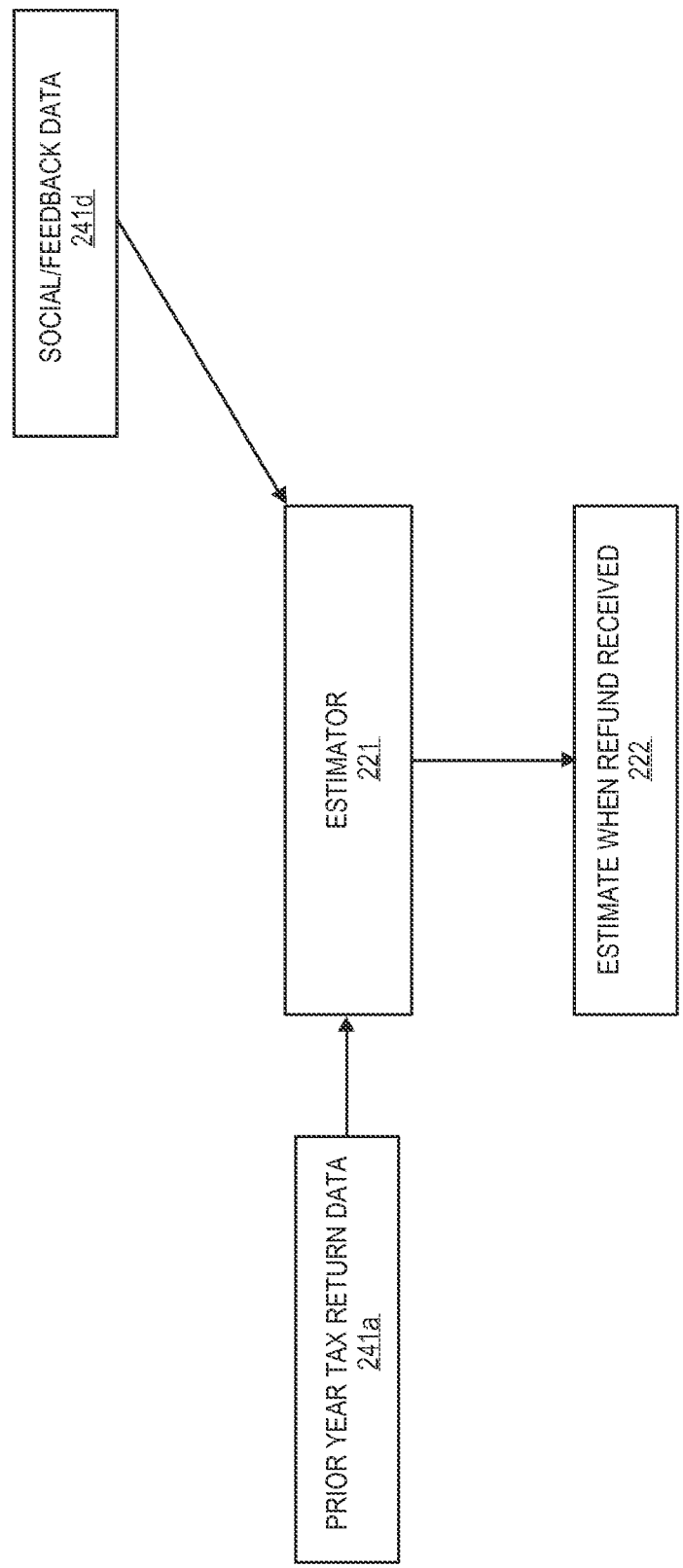
Figure 5D:
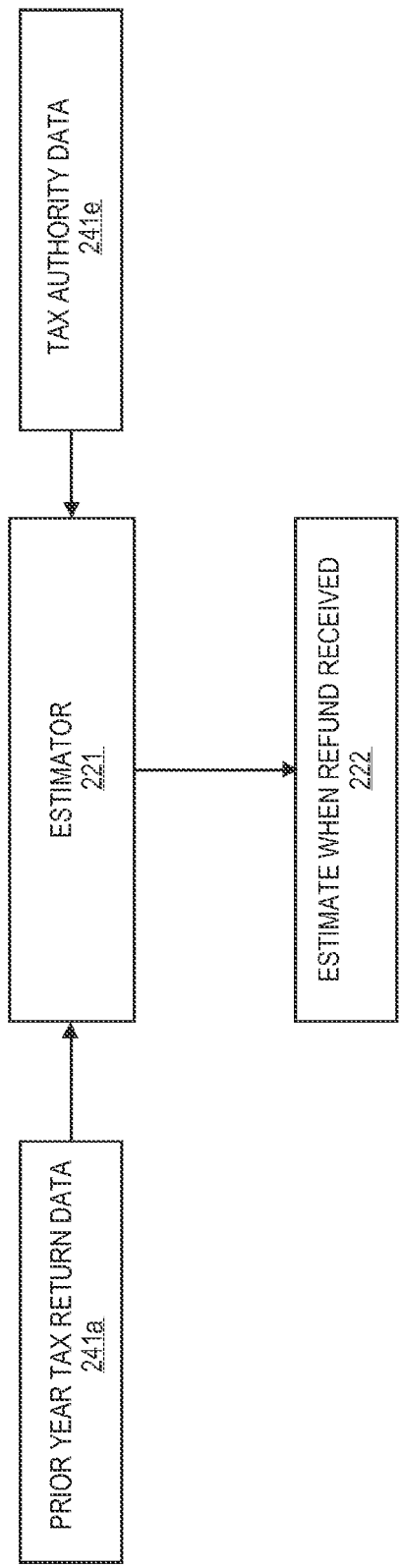
Figure 5E:
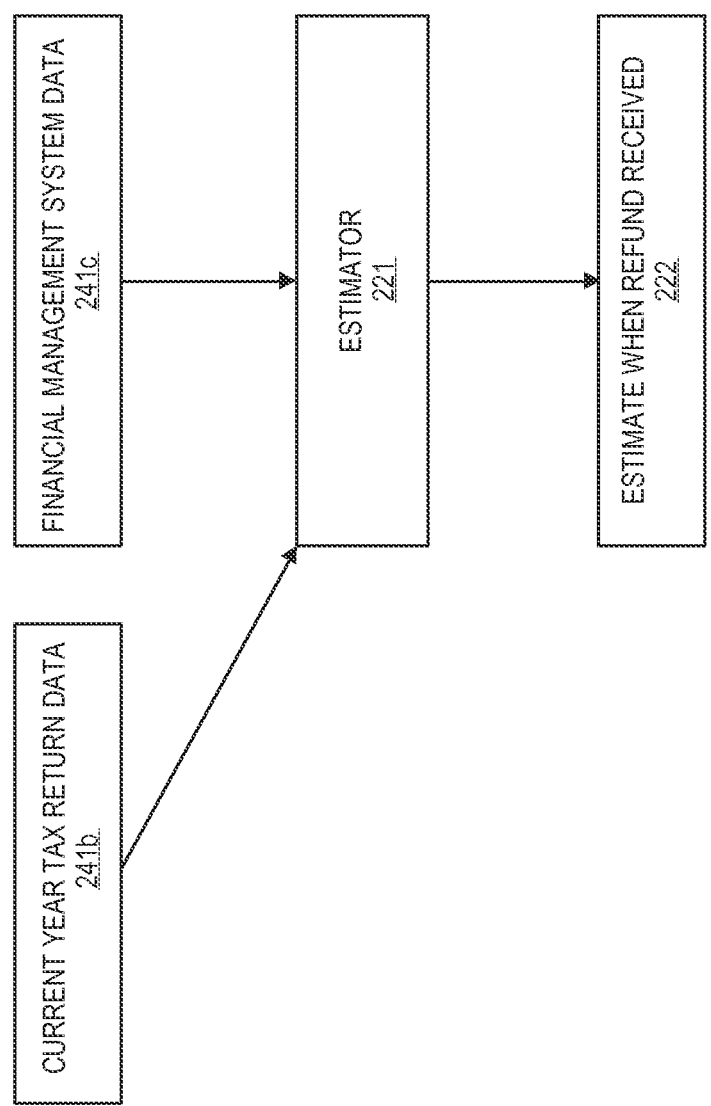
Figure 5F:
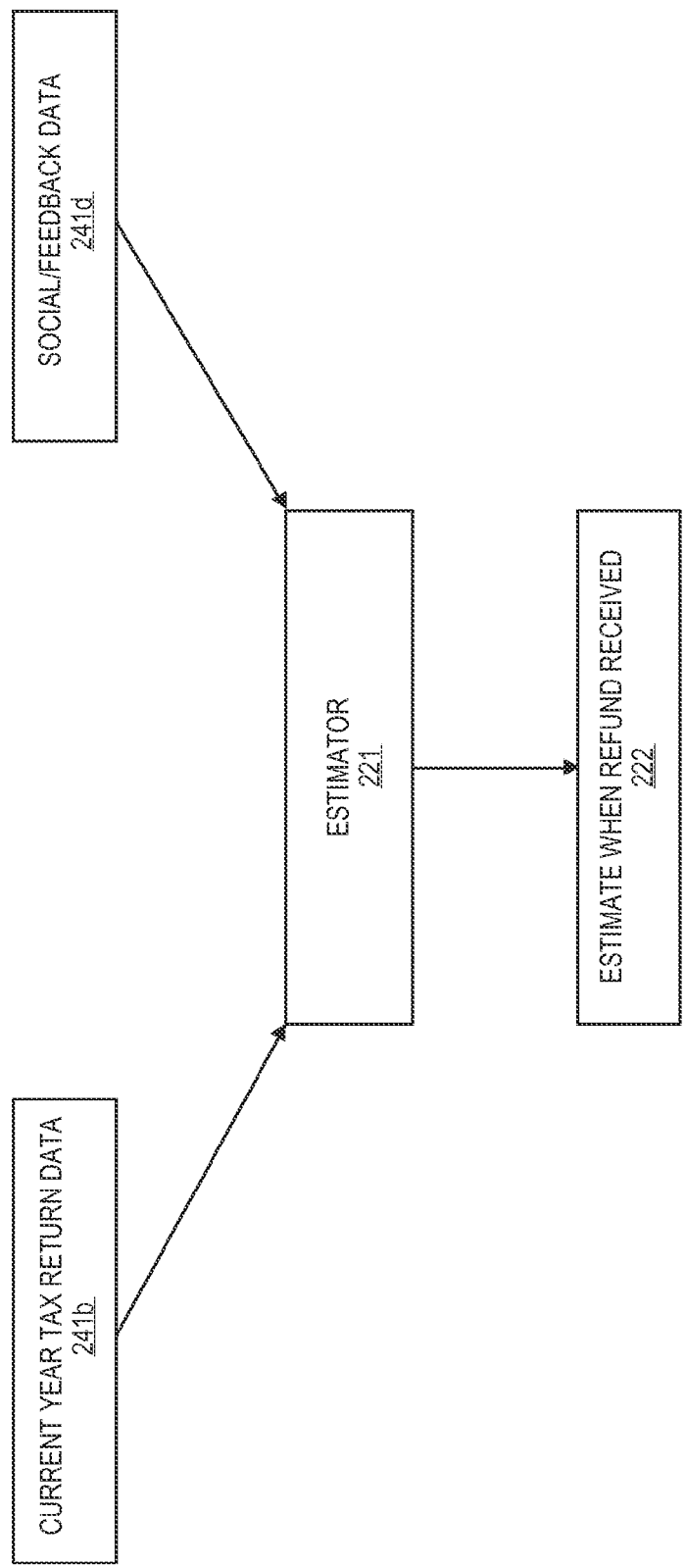
Figure 5G:
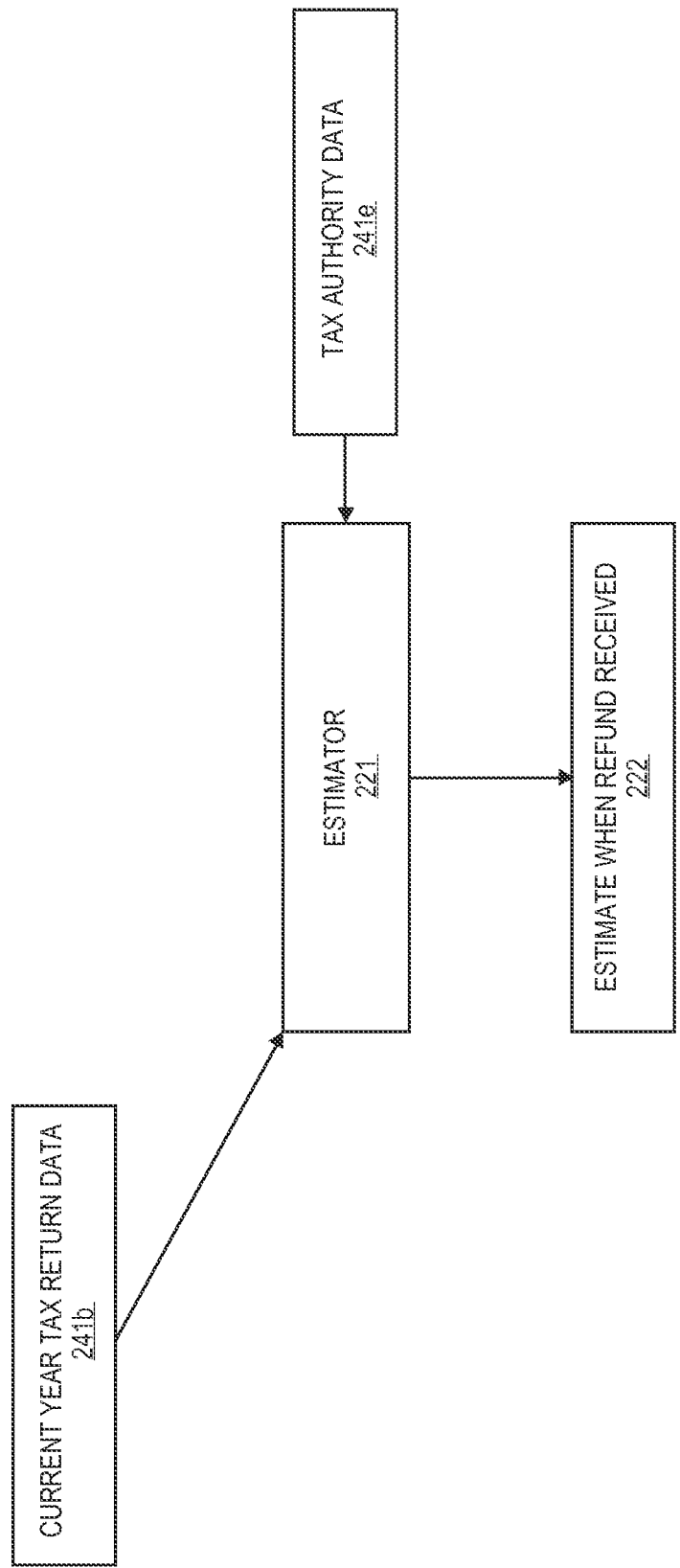
Figure 5I:
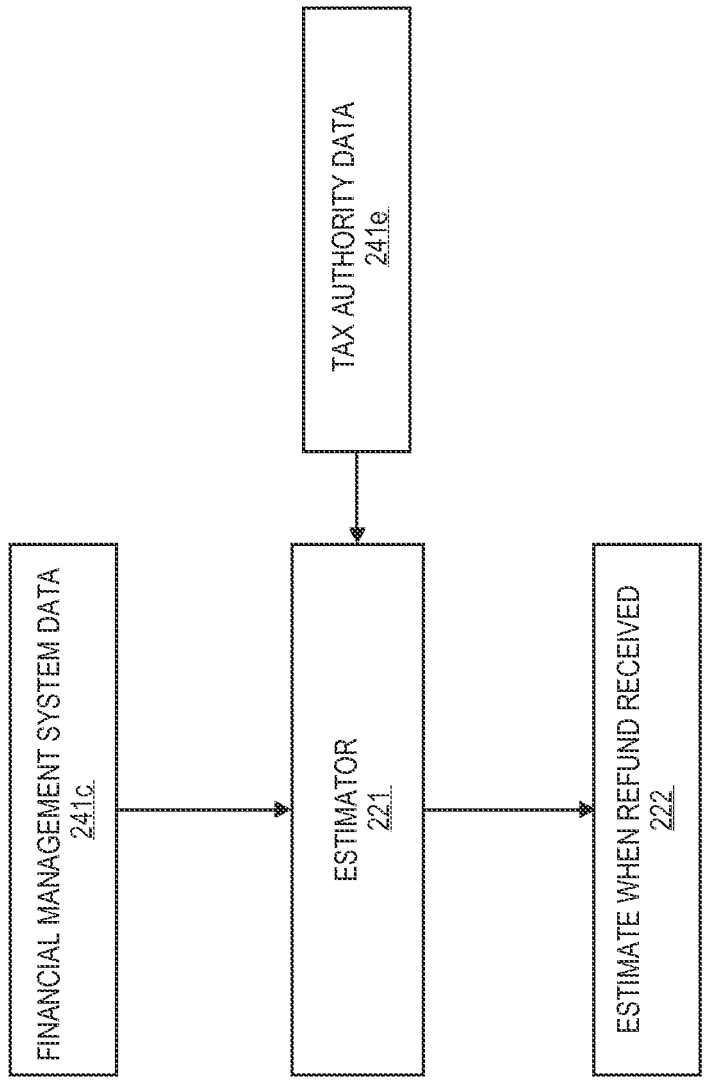
Figure 5J:
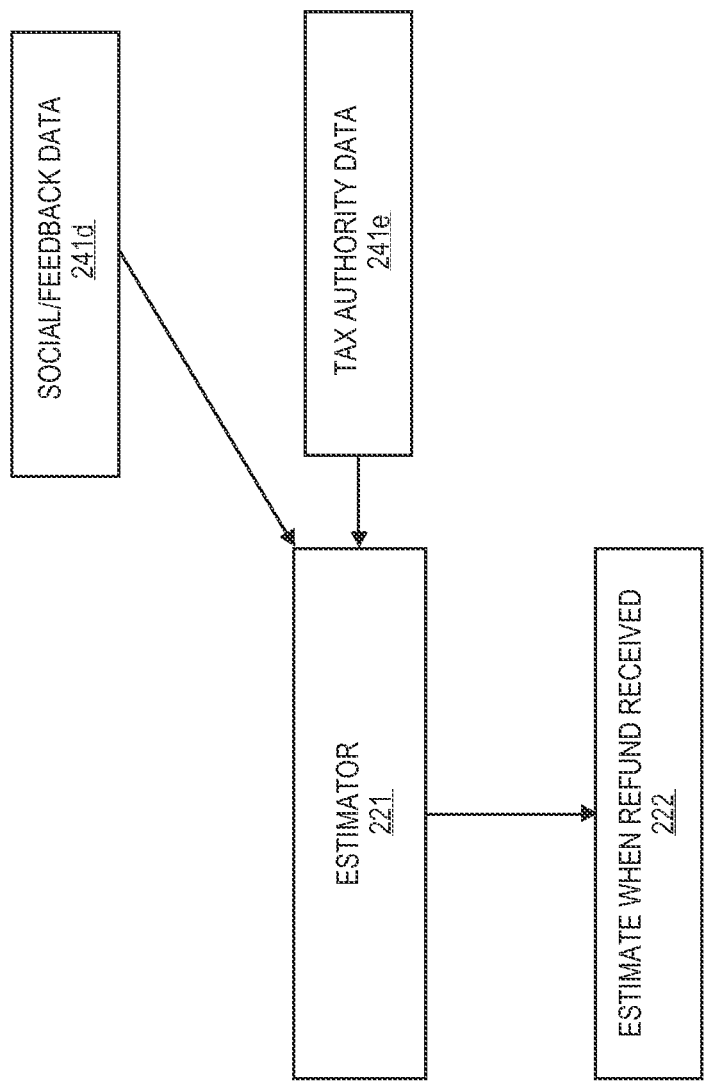
Figure 5K:
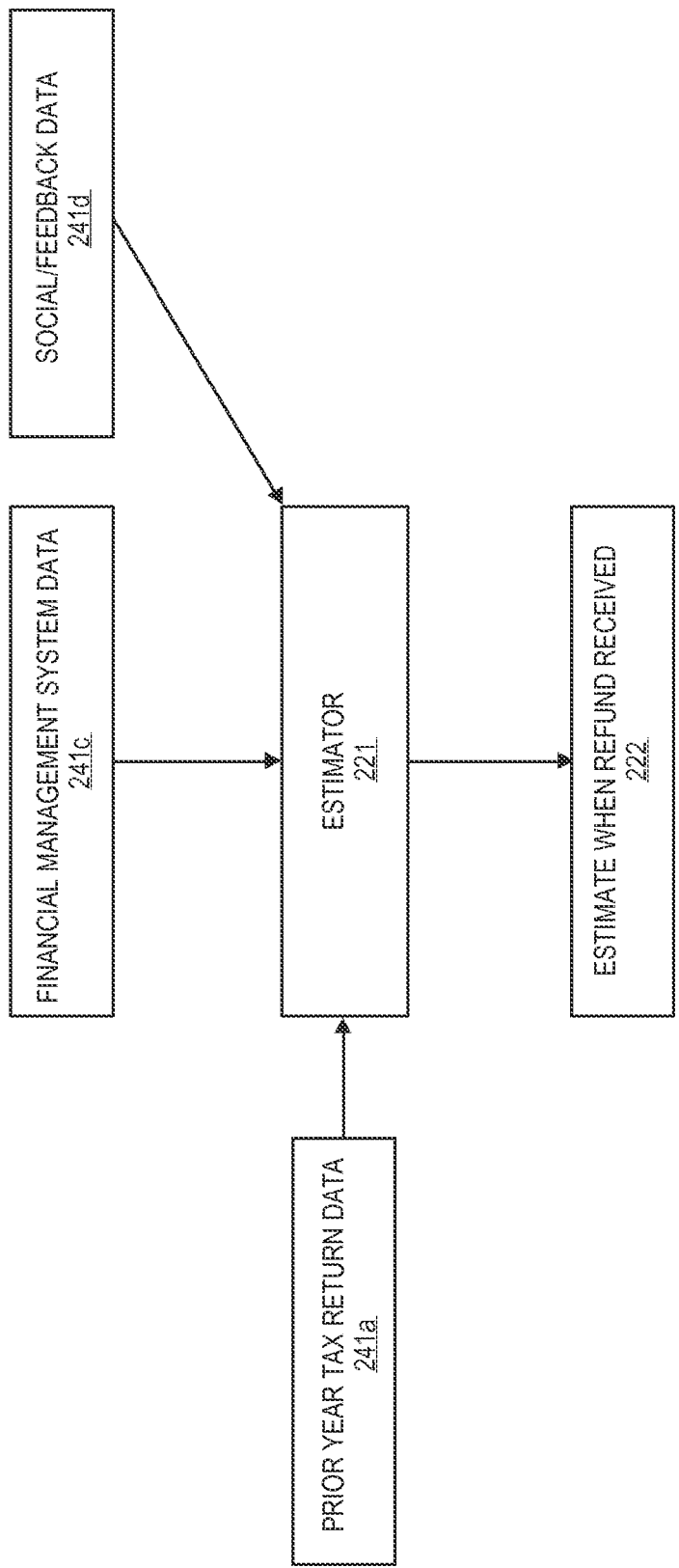
Figure 5L:
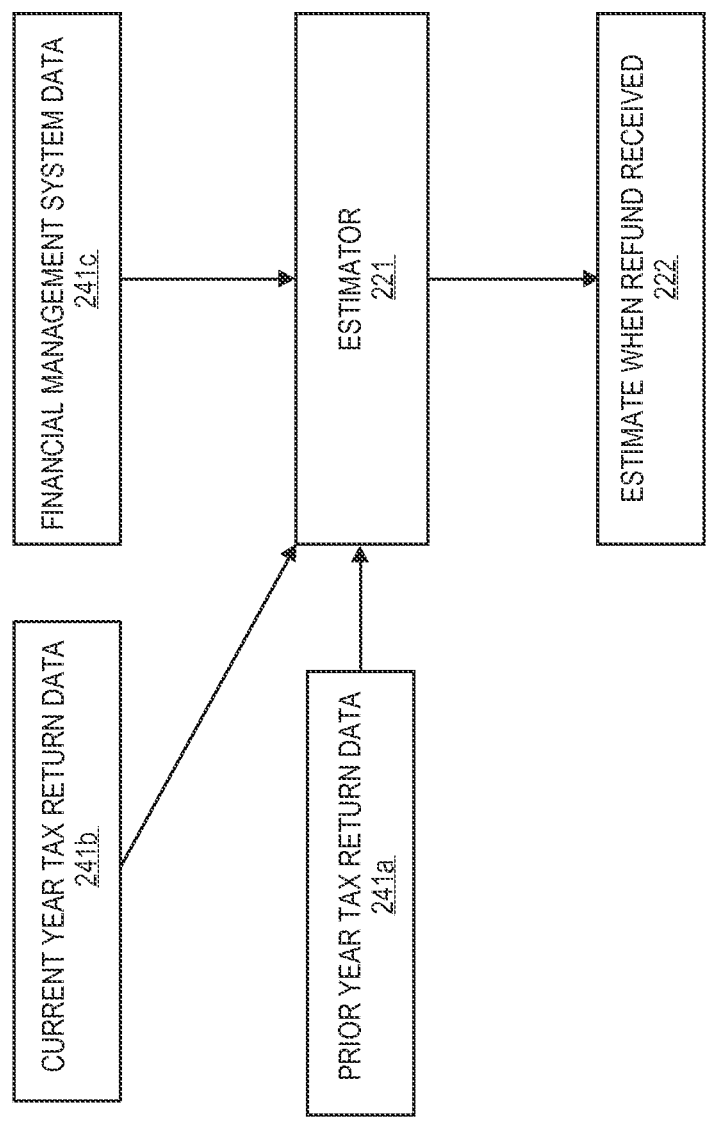
Figure 5M:
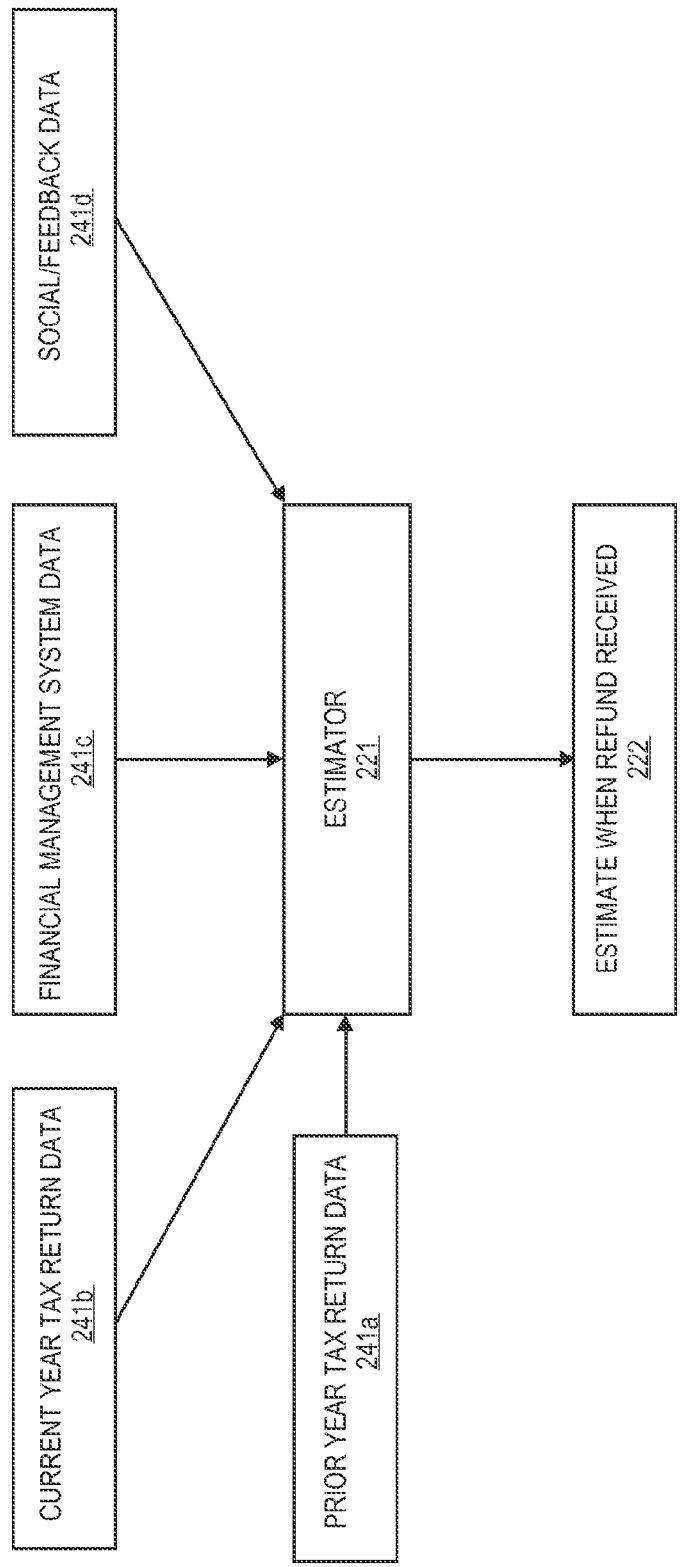

Referring to FIG. 4, steps 306-308 may involve various types of data 241 from different sources and combinations thereof. FIG. 4 illustrates an embodiment in which the estimator 221 receives one or more or all of prior year or historical tax return data 241a, current year tax return data 241b, FMS data 241c such as transaction or deposit data, or feedback data 241d acquired through the tax preparation application 221 or a social networking site (generally, feedback data 241d) from other taxpayers or users of the tax preparation application 211, and tax authority data 241e.

FIGS. 5A-M illustrate non-limiting examples of types and combinations of data 241 may be used to derive or generate the estimate 222 according to embodiments. Combinations include two, three and four or more different types of data including: 1.) prior year tax return data 241a and current year tax return data 241b; 2.) prior year tax return data 241a and FMS data 241c such as electronic transaction or deposit data 272 aggregated by the FMS 227; 3.) prior year tax return data 241a and feedback data 241d from other users or taxpayers regarding whether and when they received their refunds; 4.) prior tax return data 241a and tax authority data 241e (which may involve one or more or all of the tax authority's own estimate 232 about when the taxpayer 215 will receive the refund 213, data about tax authority processing times or delays or other matters that may affect processing such as fraud and audit investigations, and which tax authority funding system or track is utilized to distribute refunds to tax payers, e.g., distributing refunds a particular day such as every Tuesday, or on a rolling basis); 5.) current year tax return data 241b and FMS data 272; 6.) current year tax return data 241b and feedback data 241d; 7.) current year tax data 241b and tax authority data 241e; 8.) current year tax return data 241b and tax authority data 241e; 8.) FMS data 241c and feedback data 241d; 9.) FMS data 241d and tax authority data 241e and 10.) feedback data 241d and tax authority data 241e; and combinations of three or more types or source so data including, but not limited to: 1.) prior year tax return data 241a, FMS data 241c and feedback data 241d; 2.) prior year tax return data 241a, current year tax return data 241b and FMS data 241c; 3.) prior year tax return data 241a, current year tax return data 241b, FMS data 241c and feedback data 241d.

Thus, embodiments may involve two, three, four and other numbers of data types. Further aspects of embodiments and particular examples of how embodiments may be implemented utilizing are explained in further detail below. It will be understood that these are examples, and embodiments are not so limited.

Figure 6:
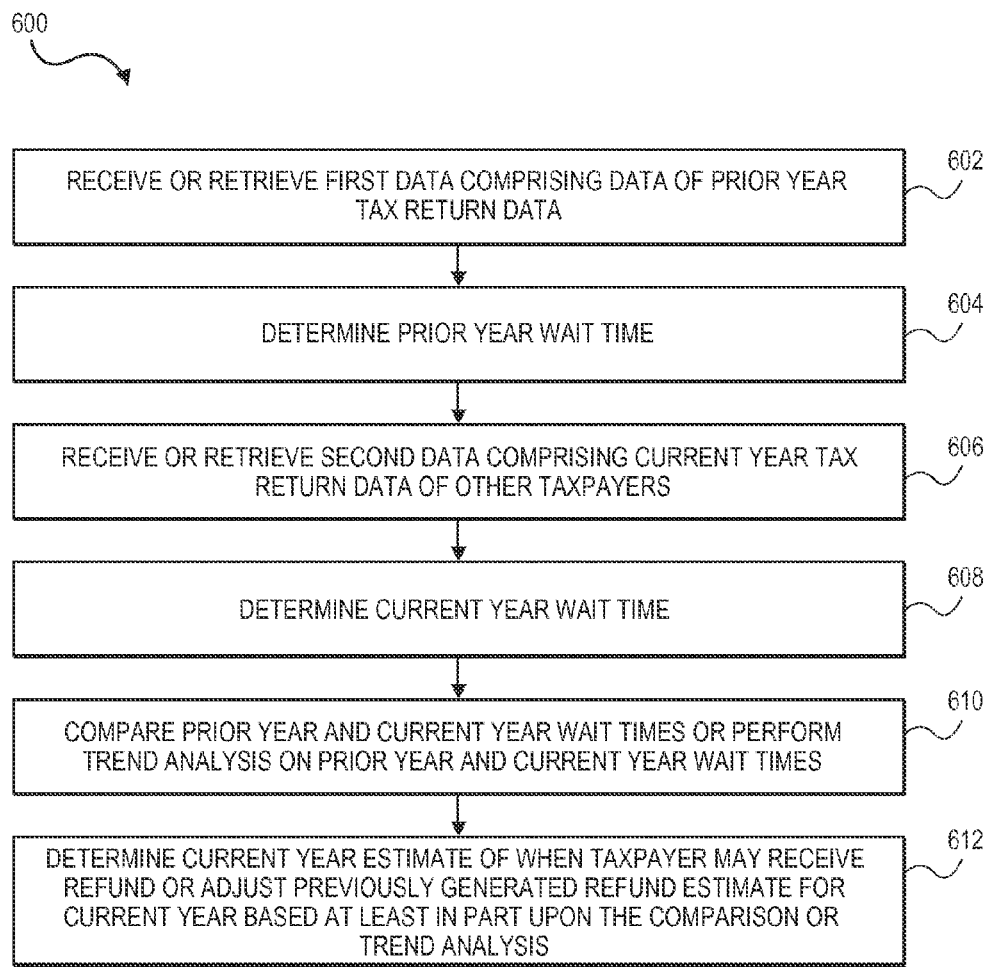
FIG. 6 illustrates an embodiment of a method for generating an estimate of when a taxpayer can expect to receive a tax refund based at least in part upon prior year and current year tax return data.

Referring to FIG. 6 and with further reference to FIGS. 7A-B, in a method 600 according to one embodiment, the estimator 221, at 602, accesses, receives or retrieves from the data store 240 or other source first data in the form of prior year tax return data 241a that was previously processed and stored by the tax preparation application 211 or other source, and at 604, determining a prior year wait time, or how long prior year taxpayers had to wait for their refunds.

Referring to FIG. 7A, a table, database or other data structure 700 (generally, table 700) of the data store 240 may include prior year tax return data 241a. Prior year tax return data 241a may include, for example, identification 702a of the prior year tax payer, the date 702b (and time if known) the taxpayer's prior year tax return was filed with and/or accepted by the tax authority 235 (if the acceptance date/time differs from the filing date/time), the date or other data 702c when the prior year tax refund was received by the prior year taxpayer and based on 702b-d, how long prior year taxpayers had to wait for their refunds 702d, as determined by the estimator 221 or tax preparation application 211.

The table 700 may be populated by the estimator 221 with different types of prior year data of prior year tax returns as processed by the intermediate computer 220 or another computer or source that may be in communication with the intermediate computer 220. For example, the table 700 can be populated with prior year tax return data 241a data previously stored to the data store 240 by the prior year tax preparation application after processing of the prior year tax returns was completed. As another example, if not already stored in the data store 240, the estimator 221 can populate the table 700 with another type of prior year tax return data 241a or data from another source such as another intermediate computer or other FI computer in communication with the intermediate computer 220 and that hosted a temporary account utilized to receive the prior year refund from the tax authority 235, pay any fees that were due to the host 225 such as the cost of the tax preparation application 221 utilized to prepare and file the prior year electronic tax return 212, and distribute the remaining prior year refund amount to the taxpayer 215, as discussed above with reference to FIGS. 2A-B. For example, the other intermediate computer or source may transmit taxpayer identification and the date when the other intermediate computer received a prior year refund for that taxpayer to the intermediate computer 220 for storage to data store 240.

For ease of explanation, reference is made generally to prior year tax return data 241a received, accessed or managed by the intermediate computer 220. It will be understood that the estimator 221 may utilize different types and sources of prior year tax return data 241 and combinations thereof, which may include one or more or all of identification 702a of the prior year taxpayer, the date 702b (and time known) the taxpayer's prior year tax return was filed and/or accepted, the date or other data 702c regarding when the prior year tax refund was received by the prior year taxpayer or by an intermediary processor such as the intermediate computer 220, and based on 702b-c, how long prior year taxpayers had to wait for their refunds 702d.

The refund date data 702c of when a prior year refund was received may be based on, for example, one or more of when prior year refunds are processed through the intermediate computer 220 or other intermediary processor or FI computer in communication with the intermediate computer 220, prior year feedback 241d when refunds are directly deposited into a designated account and not routed or processed through the intermediate computer 220 and prior year FMS data 241*c*. The table 700 may also include data indicating the type of refund (e.g., direct deposit, or refund card) and a source of prior year refund data such as taxpayer feedback, the tax preparation application 221, FMS 227 or another intermediary source.

According to one embodiment, the estimator 221 analyzes a pre-determined minimum number of prior year tax returns of one or multiple years. For each prior year tax return, the estimator 221 retrieves the filing and/or acceptance dates (and times if known) of those prior year tax returns, dates refunds were received by taxpayers, and determines prior year wait times 702*d*. In the event that multiple prior year tax returns are analyzed, the prior year wait time 702*d* can be determined based on a statistical function such as, for example, the mean or median refund wait time of the prior year tax returns analyzed by the estimator 221.

Referring again to FIG. 6 and with further reference to FIG. 7B, at 606, the estimator 221 receives or retrieves from the data store 240 second data comprising current year tax return data 241*b*, e.g., current year tax returns that have already been filed with and accepted by the tax authority 235. The data store 240 accessed by the estimator 221 may store current year tax return data 241*b* in a table 710.

In the illustrated embodiment, the table 710 includes identification 712*a* of current year taxpayers, the date 712*b* (and time if known) the current year tax returns were filed and/or accepted, whether the current year refund was received by current year taxpayers 712*c*, the date or other data 712*d* when the current year tax refunds were received, and data 712*e* of how long those current year taxpayers had to wait for their refunds, or how long they have waited to date if the refunds have not been received. The table 710 may also include data indicating the type of refund (e.g., direct deposit, or refund card) and a source of the current year refund data such as taxpayer feedback, the tax preparation application 221, FMS 227 or another intermediary source.

The table 710 may be populated by the estimator 221 with different types of current year data of current year tax returns as processed by the intermediate computer 220 or another computer or source in communication with the intermediate computer 220. For example, the table 710 can be populated with current year tax return data 241*b* stored to the data store 240 by the current year tax preparation application 211 after processing of current prior year tax returns. As another example, if not already stored in the data store 240, the estimator 221 can populate the table 710 with current year data received from another source such as another intermediate computer or other FI computer in communication with the intermediate computer 220 and that hosts a temporary account used during the current year to receive current year refunds from the tax authority 235, pay any fees due to the host 225 such as the cost of the tax preparation application 221 utilized to prepare and file the current year electronic tax return 212, and distribute the remaining current year refund amount to the taxpayer 215 as discussed above with reference to FIGS. 2A-B. For example, the other intermediate computer or source may transmit taxpayer identification and the date when the other intermediate computer received a current year refund for that taxpayer to the intermediate computer 220 for storage to the data store 240 and analysis by the estimator 221.

For ease of explanation, reference is made generally to current year tax return data 241*b* received, accessed or managed by the intermediate computer 220. It will be understood that the estimator 221 may utilize different types and sources of current year tax return data 241*b*, which may include one or more or all of identification 712*a* of the current year taxpayer, the date/time 712*b* the taxpayer's current year tax return was filed and/or received, an indicator 712*c* of whether a current year refund has been received, the date or other data 702*d* when the current year tax refund was received by or transmitted to the current year taxpayer and based on 712*b-d*, how long current year taxpayers had to wait for their current year refunds 712*e*.

Embodiments may store prior year tax return data 241*a* and/or current year tax return data 241*b* for some or all taxpayers that utilized the tax preparation application 211, e.g., depending on how many refunds were processed through the intermediate computer 220 or other intermediary processor or FI computer, or how many taxpayers provided feedback after receiving their refunds. A sufficient sampling of can be representative of prior year wait times and current year wait times.

Continuing with reference to FIG. 6, at 608, the estimator 221 determines a current year wait time experienced by other taxpayers for the current tax year. For example, the estimator 221 may analyze a pre-determined minimum number of current year tax returns and for each current year tax return, and access table 710 or determine when the current year tax return was filed and when the current year tax refund was received to determine a current year wait time. The current year wait time for these current year tax returns may be the mean or median of the wait times of the current year tax returns analyzed.

Continuing with 610, according to one embodiment, the estimator 221 analyzes or compares the determined prior year and current year wait times or mean, median or other statistical data derived therefrom, and at 612, determines an estimate 222 for when the taxpayer 215 may receive the refund 213 for the current year tax return based at least in part upon the analysis.

For example, the estimator 221 may compare wait times of a current year and a previous year, or multiple prior years, in order to analyze or identify a wait time trend, or a deviation from an established or historical wait time trend, and then generate the estimate 222 based at least in part upon that trend or deviation analysis involving a comparison of prior and current year tax return data 241*a,b*. Further, in the event that an estimate 222 was previously generated, as more current year refund data 241*b* is received and stored to the data store 240 and analyzed by the estimator 221, the estimator may change or update a prior refund estimate to a new or revised refund estimate for the taxpayer 215 (and other current year taxpayers waiting for their refunds).

Figure 8:
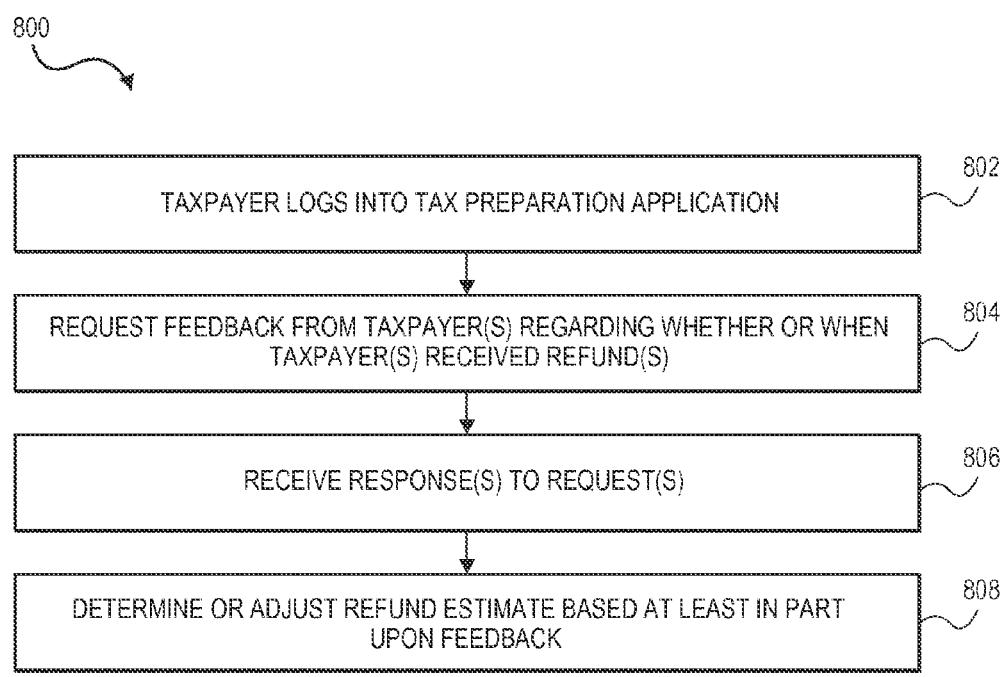
FIG. 8 illustrates one embodiment of a method for generating an estimate of when a taxpayer can expect to receive a tax refund based at least in part upon social or feedback data.

Referring again to FIG. 3 (306, 308), and with reference to FIG. 8, an example of how taxpayer feedback 241*d* can be acquired and utilized to generate an estimate 222 is provided. The estimate 222 is generated based on the feedback data 241*d* or based on a combination of feedback data 241*d* and one or more other types of data 241 as discussed above.

At 802, the electronic tax return 221 has been filed, and the taxpayer 215 logs into the tax preparation application 211 or account the taxpayer 215 has with the host 225. At 804, the estimator 221 requests feedback from taxpayer(s) regarding whether or when they have received refund(s), e.g., through a window or screen generated by the tax preparation application 211, or via a separate survey or feedback form completed by a taxpayer and transmitted back to the tax preparation program 211 or estimator 221. At 806, the estimator 221 receives feedback data 241*d* in response to the requests, and at 808, determines or updates a refund estimate 222 based at least in part upon the feedback data 241*d*. The feedback data 241*d* may also be utilized to modify or adjust a prior estimate 222 in order to account for current wait trends. Embodiments may also involve analysis of prior year feedback 241*d* and current year feedback 241*d*.

Figure 9:
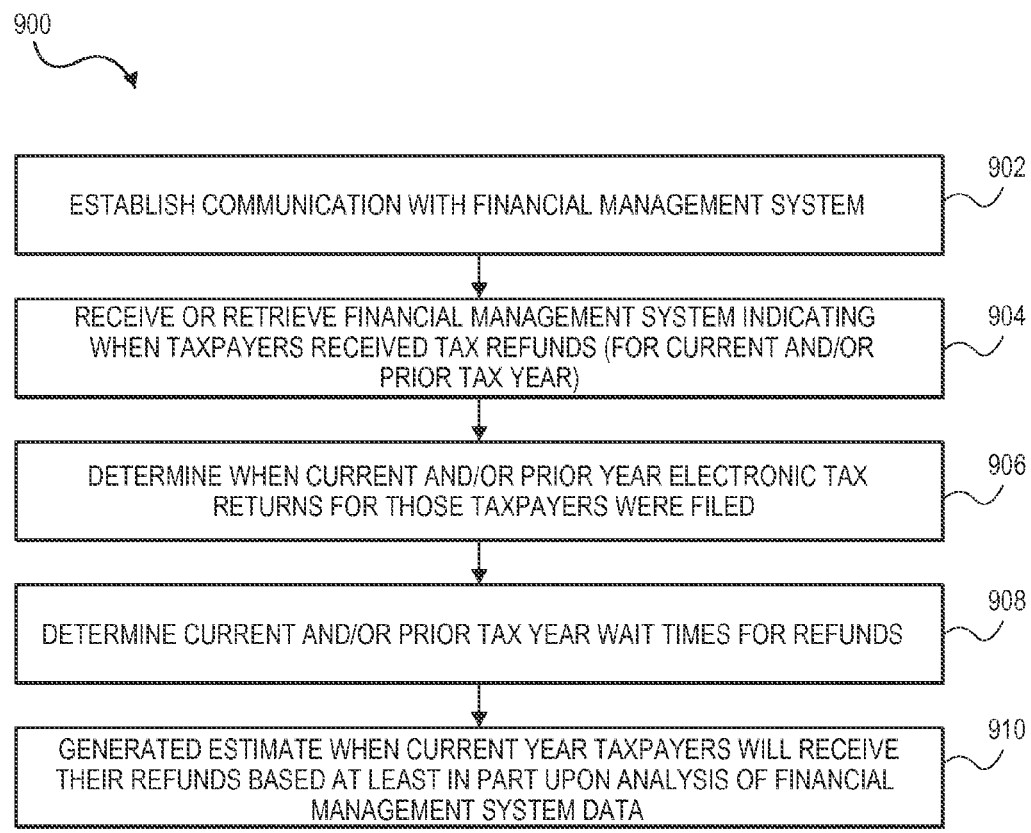
FIG. 9 illustrates one embodiment of a method for generating an estimate of when a taxpayer can expect to receive a tax refund based at least in part upon financial management system data.

With continuing reference to FIG. 3 (306, 308) and FIG. 9, embodiments may also utilize transaction data 272 of the FMS 227 utilized by the taxpayer 215 and that receives, collects or aggregates electronic transaction data 272 of taxpayer account(s) 271 at the taxpayer's FI(s) 275. The estimate 222 is generated based at least in part upon the FMS data 241*c* or based on a combination of the FMS data 241 and one or more other types of data 241 as discussed above. Embodiments may also involve analysis of prior year FMS data 241*c* and current year FMS data 241*c*.

In one method 900 embodiment, at 902, the estimator 221 or tax preparation application 211 establishes communication with the FMS 227. For this purpose, the intermediate computer 220 may manage both the tax preparation application 211 and the FMS 227. In other embodiments, the tax preparation application 211 and FMS 227 are managed or made available by different hosts. In embodiments involving different hosts, the taxpayer 215 may provide FMS 227 information to the tax preparation application 211 or provide any required login information to the tax preparation application 211, which may then automatically access and review FMS data 241*c* including transaction and electronic deposit data.

At 904, the estimator 221 receives or retrieves FMS data 241*c* indicating when taxpayers received respective tax refunds (for current and/or prior tax year) and/or corresponding electronic transaction data that identifies the date, amount and deposit amount. The refund that results in generation of such data may be a result of a direct deposit from the tax authority 235 into a designated account, or by the taxpayer depositing a refund check received from the tax authority 235 with a FI at which the taxpayer has an account.

At 906, having received or determined the deposit or receipt data of the refund based on the received FMS data 241*c*, the estimator 221 determines when the corresponding current and/or prior year electronic tax returns for those taxpayers were filed and/or accepted. Embodiments may involve analysis of FMS data 241*c* for only the current tax year or other prior tax years if it is available. At 908, the estimator 221 determines how long taxpayers had to wait to receive the current tax year refund and/or prior tax year refund(s). At 910, the estimate 222 of when the subject taxpayer 215 can expect to receive the refund 213 is generated relative to the filing and/or acceptance date and current date based at least in part upon the FMS data 241*c*.

Figure 10:
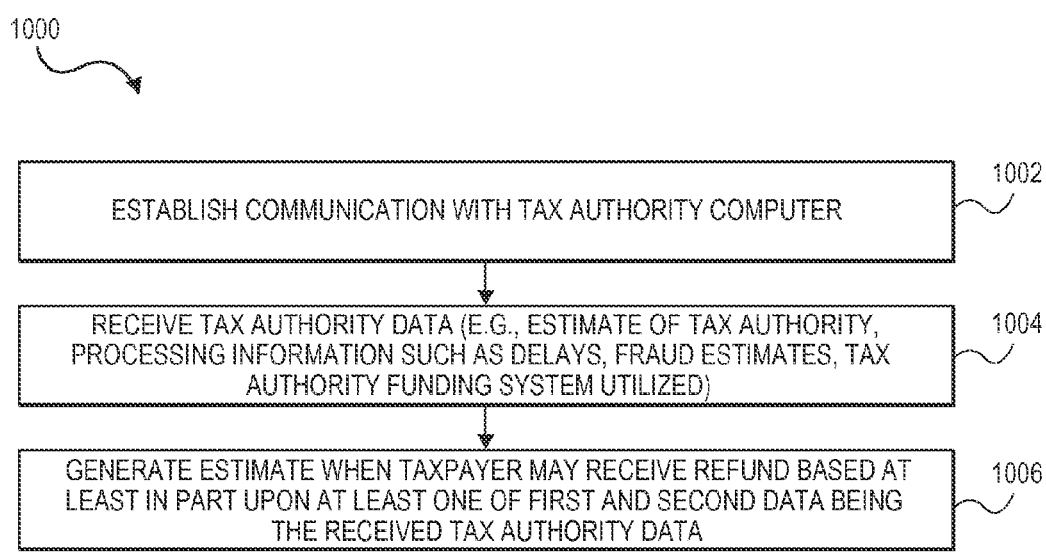
FIG. 10 illustrates one embodiment of a method for generating an estimate of when a taxpayer can expect to receive a tax refund based at least in part upon data of a tax authority with which an electronic tax return was filed.
Figure 11:
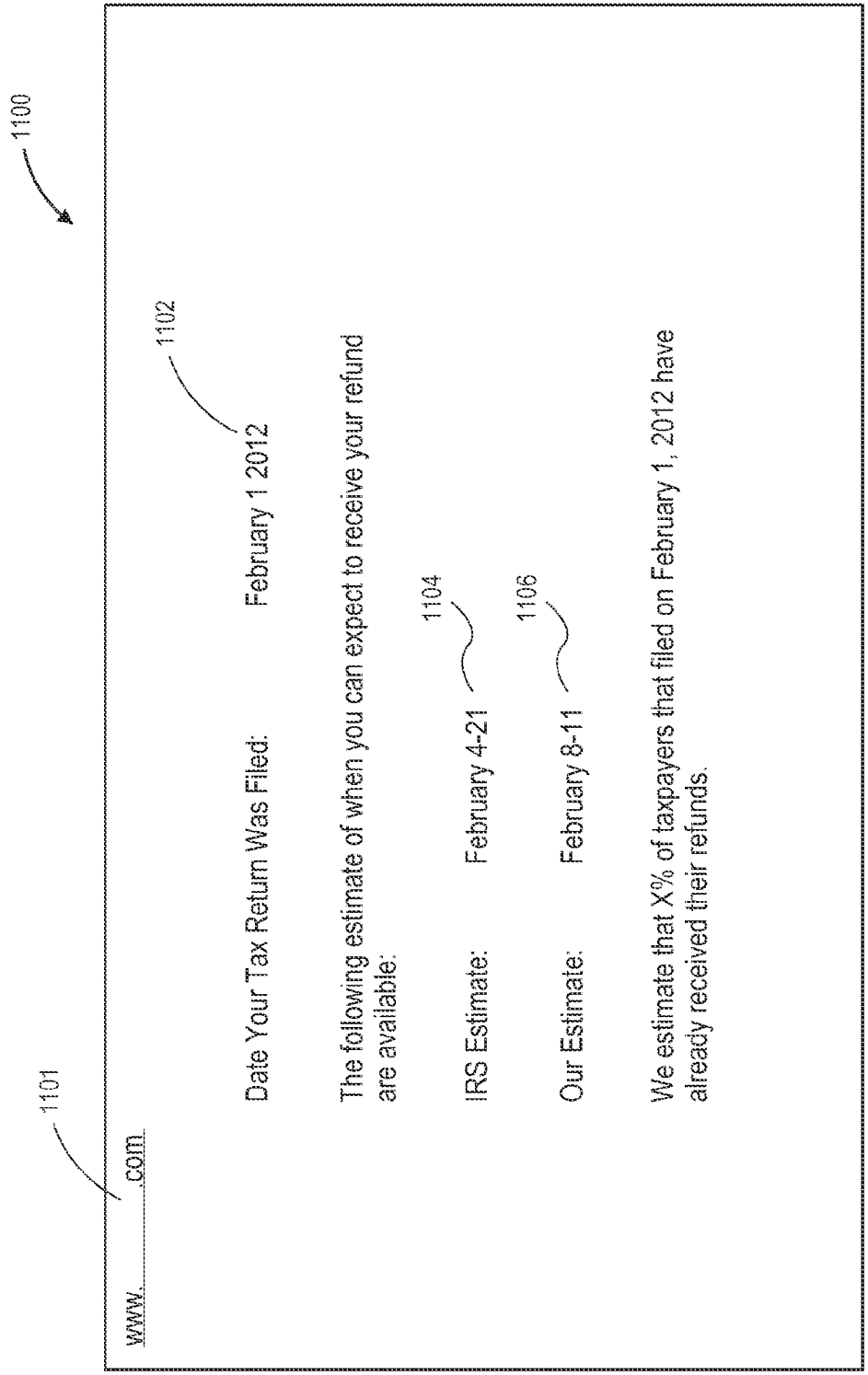
FIG. 11 illustrates a screen of a website through which estimates generated according to embodiments can be presented to taxpayers.

With continuing reference to FIG. 3 (306, 308), and with further reference to FIGS. 10-11, the estimate 222 of how long a taxpayer 215 may have to wait for a refund 213 may also consider and process data 241*e* from the tax authority 235 as a factor in determining the estimate 222. In a method 1000 according to one embodiment as shown in FIG. 10, the estimator 221, at 1002, establishes communication with or request or receives data 241*d* from a computer 230 of the tax authority 235. At 1004, the estimator 221 receives the tax authority data 241*e*.

One example of tax authority data 241*e* includes an estimate 232 generated by the tax authority 235 of when a taxpayer can expect to receive a refund. Another example of tax authority data 241*e* includes tax authority 235 scheduling or delays in processing tax returns and refunds, mailing, distributing or transmitting refunds. Yet another example of tax authority data 241 includes how other actions such as audits and reviews affect tax return and refund processing. A further example of tax authority data 241*e* includes which tax authority 235 funding systems are utilized to process tax returns. For example, a tax authority 235 may be a batch-oriented system that operates based on the date/time a refund was received or accepted by the tax authority 235. Daily and weekly filing or acceptance cutoffs may dictate when a refund will be processed or distributed. A tax authority 235 funding system may distribute refunds on a pre-determined day such as every Tuesday or on a rolling basis.

For example, a tax authority 235, such as the IRS, may have two backend systems. In one system, refunds may be paid on a pre-determined day, e.g., every Tuesday. If a tax return is accepted by a certain time (e.g., by 11:00 am) on a first Tuesday, then those taxpayers will receive the refund the following, second Tuesday. If a tax return is accepted after that date/time, those later accepted taxpayers will receive the refund on the following, third Tuesday. With the "every Tuesday" system, refunds may take between 7 and 13 days to process. Another tax authority system may pay refunds Monday through Friday with the number of days (5-7) based on the day of the week and time of day the tax return 211 was accepted.

Tax authority data 241*e* reflecting these processing schedules may be reflected in a table including, for each day, data for a date/time when other tax returns were filed/accepted, the tax authority estimate 232 for those returns or the advertised refund date range provided by the tax authority 235. The table can be populated to store prior year and populated to store current year data. For ease of explanation, reference is made generally to tax authority data 241*e*, and to data 241 generally, which may include one or more or all of data 241*a-e*.

Referring again to FIG. 10, at 1006, the estimate 222 of when the taxpayer 215 will receive the refund 213 is generated based at least in part upon at least one of first and second (or additional data) data being one or more types of data 241*d* generated, hosted or managed by the tax authority 235 and made available to the public or to the estimator 221. According to one embodiment, the estimate 222 generated by the estimator 221 is generated independently of any other estimate, including any estimate 232 generated or provided by the tax authority 235. Thus, while FIG. 10 describes one embodiment in which tax authority data 241*e* (which may include a tax authority estimate 232) is considered in generating an estimate 222 according to embodiments, in other embodiments, the tax authority estimate 232 is not considered at all in the estimate 222 determination, but other tax authority data 241*e* may be considered. Thus, embodiments may consider the tax authority estimate 232 as a factor, or disregard the tax authority estimate 232 altogether and generate a separate estimate 222 independently of the tax authority estimate 232 and/or other tax authority data 241*e*.

Generating the estimate 222 (FIG. 3, 308) may involve various types and combinations of data 241 described above, and certain data may be weighted or more of a factor in the generated estimate 222 than other types of data. For this purpose, embodiments may utilize a weighting or factor function 223 to the different data 241 utilized to generate the estimate 222.

In certain embodiments, larger weights or factors may be assigned to data or sources thereof that are considered more reliable or accurate than other data or sources thereof. The host 225 may select or determine these weights or factors. Larger weights or factors can also be assigned to sources of estimates or data involving a smaller, more focused or accurate window of time compared to other sources. For example, FMS data 241*c* indicating when a prior year or current year tax refund was received by another taxpayer as determined by an electronic deposit may be weighted more heavily than a general "2-3 week" estimate 232 of the tax authority 235. As another example, larger weights or factors can be assigned to other intermediary sources hosting temporary accounts for direct deposit and that provide the intermediate computer 220 with date of receipt of refund data. Larger weights can also be assigned to more current year data, and more recent current year data. For example, when analyzing prior year tax data 241a and current year tax data 241b, the current year tax data 241b can be weighted more heavily than prior year tax data 241a. The weighting assigned to prior year tax data 241a versus current year tax data 241b can also be based at least in part upon the difference between the data, e.g., if current year data 241b shows a trend or deviation from prior year tax data 241a, then current year data 241b can be weighted more heavily. For example, the new tax laws may have been implemented and are effective in the current tax year thus causing delays in tax return processing such that the current year tax data 241b (showing longer wait times for refunds) may be weighted more heavily than prior year tax data 241a showing refunds were issued more quickly in the past. As yet another example, current year electronic deposit data of the FMS 227 can be weighted more heavily than prior year electronic deposit data. While these weighting functions or factors are provided as illustrative examples of embodiments, it will be understood that these examples are provided as non-limiting examples of how embodiments may be implemented.

Referring again to FIG. 3, at 310, having generated the estimate 222, the tax preparation application 211 or estimator 221 presents, displays or transmits the generated estimate 222 to the taxpayer 215. One manner in which this may be done is by displaying the estimate 222 to the taxpayer 215 while the taxpayer 215 is logged into the tax preparation application 211. An electronic message such as an electronic mail or SMS message may also be transmitted to a computer, computing apparatus or mobile communication device 210 of the taxpayer 215.

Referring to FIG. 11, the taxpayer 215 may also be provided with a link 1101 to a website 1100 (e.g., as shown in FIG. 11) that the taxpayer 215 can access without having to log into the tax preparation application 211. In the illustrated example, the taxpayer 215 can enter into field 1102 the date the electronic tax return 211 was filed, and based on that date, the tax preparation application 211 or estimator 221 looks up the generated estimate 222 corresponding to that date, and presents one or more results 1104, 1106 in the form of the generated estimate 222 and/or tax authority estimate 232. While embodiments have been described with reference to providing the taxpayer 215 with an estimate 222, the website 1100 can also be utilized by other taxpayers that did not utilize the tax preparation application 211 so that other users or taxpayers can also access generated estimates 222.

Thus, embodiments enable the taxpayer 215 (as well as other taxpayers that did not utilize the tax preparation application 211) to be more informed about the process and refund status and timing and can also compare the generated estimate 222 with that of the tax authority 232 if the tax authority estimate 232 is available, or the screen or page displaying the generated estimate 222 may also include a link to the tax authority 235 website that includes information about the tax authority's estimate 232.

According to another embodiment, the tax authority's refund estimate 232 is received by the estimator 221, and the generated estimate 222 and the tax authority's estimate 232 are displayed together to allow the taxpayer 215 to compare the two estimates 222, 232.

At 312, the estimator 221 can advise the taxpayer 215 to consult with the tax authority 235 to check on the status of the refund 213 when the estimator 221 determines that the time, date or range of dates of the generated estimate 222 has passed. Eventually, at 314, the taxpayer 215 receives the refund 213.

The refund 213 may be received in various ways. The tax authority 235 may mail a check directly to the taxpayer 215. The tax authority 235 may route the refund 213 through the intermediate computer 220 or another computer in communication with the intermediate computer 220 (as described above with reference to FIG. 2A), which then routes the refund 213 to the taxpayer 215, e.g., by electronic transfer into an account, by mail or by issuing a refund card that is credited with an amount of the refund 213 such that the taxpayer 215 can utilize the card credited with the refund 213 to purchase goods and services. One example of such a refund card is the TURBO TAX tax refund card of Intuit Inc., Mountain View, Calif. The refund 223 may also be directly deposited by the tax authority 235 into a designated account 271 of the taxpayer 215 (as described above with reference to FIG. 2B).

With continuing reference to FIG. 3, at 316, the estimator 221 receives, retrieves or determines when the taxpayer 215 received the refund 213 from one or more sources, and at 318, updates the data store 240 to indicate the refund 223 receipt data and wait time. For this purpose, the estimator 221 may access or receive data 241c of transaction or deposit data collected or aggregated by the FMS 227, social or feedback data 241d from the taxpayer 215, or a date of receipt of the tax refund 213 as determined by the refund 213 being routed and processed through the intermediate computer 220 or based on refund receipt data received from another intermediate computer involved in transferring or electronically depositing the refund 213 to the taxpayer 215.

FIGS. 12A-H are screen shots generated by a tax preparation application 211 or estimator 221 illustrating one example of how embodiments may be implemented to generate an estimate 222 of when a taxpayer can expect to receive a refund 213 and how feedback data 214d can be utilized to generate and update estimates. For ease of explanation, reference is made to the tax preparation application 211 or tax preparation application executing the estimator 221, and this particular example is described with reference to TURBO TAX tax preparation application, available from Intuit Inc.

Figure 12A:
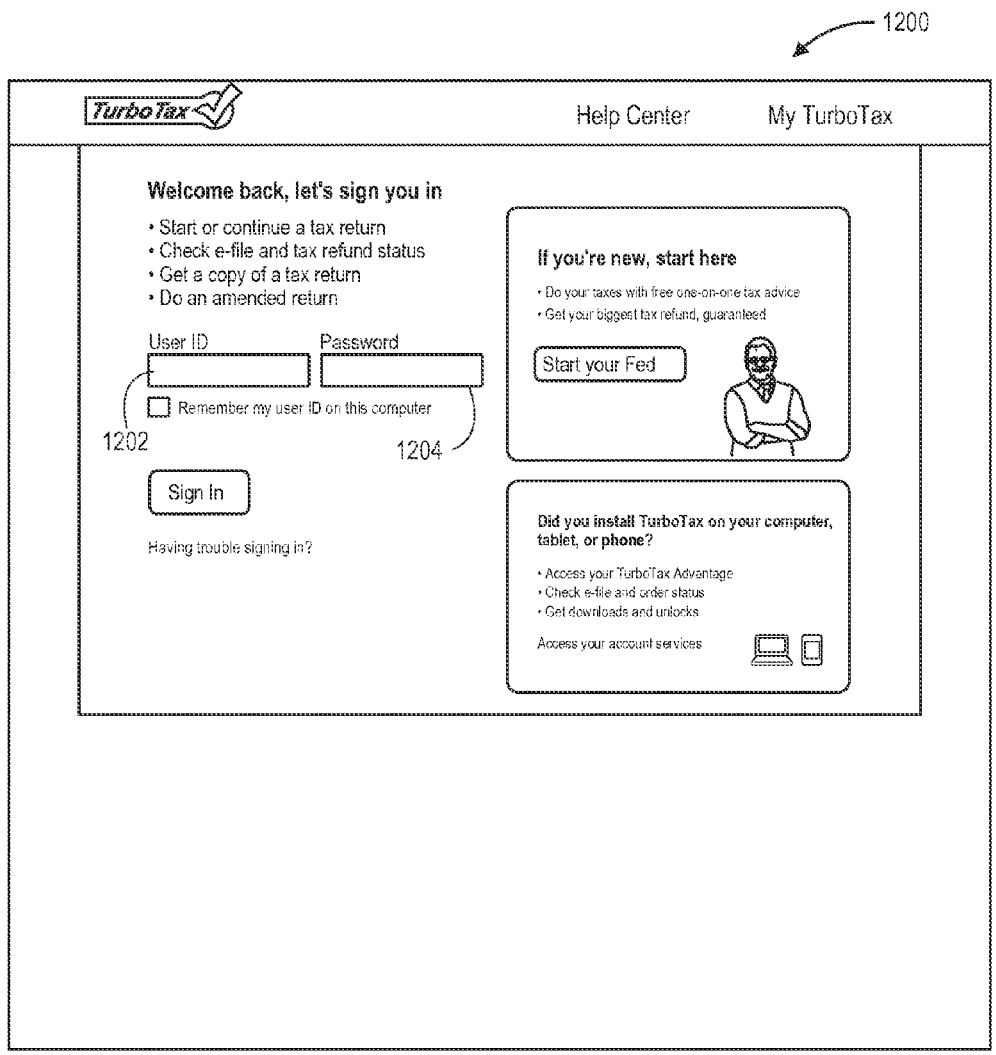

Referring to FIG. 12A, the electronic tax return 211 has been filed, and the taxpayer 215 is presented with a login screen 1200. The examples illustrated in these screen shots are based on an electronic tax return 211 that was filed on February 1. The taxpayer 215 enters login information such as user ID 1202 and password 1204.

Referring to 12B, the tax preparation application 211 retrieves the tax return 212 or tax return data associated with the login credentials, and in this example, for the tax return 212 filed February 1, the tax preparation application 211 generates a screen 1210 indicating that the taxpayer 215 will be receiving a federal refund 213a from the IRS in the amount of $1,200 and a state refund 213b from the state of California in the amount of $285. For ease of explanation, embodiments are described with reference to estimating when the taxpayer 215 will receive the federal refund 213 from a tax authority 235 of the IRS, but it will be understood that embodiments may also apply to refunds 213 from one or multiple tax authorities 235, including one or multiple federal and state tax authorities 235, and other tax authorities 235 and tax collecting entities for which tax returns 212 are filed.

Figure 12B:
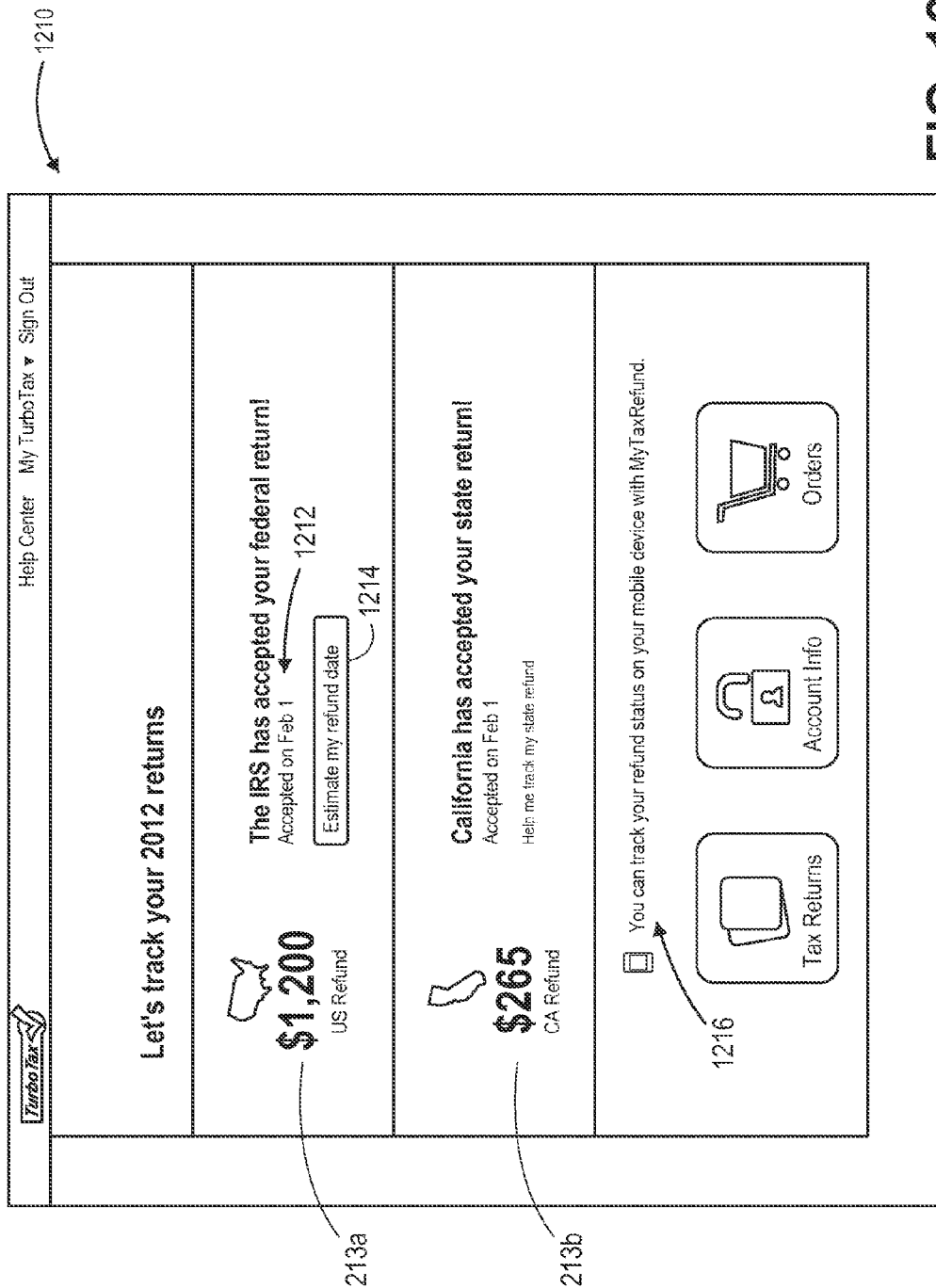

Referring to FIG. 12B, in addition to information regarding the status 1212 of the tax return 212 ("Accepted on February 1"), the taxpayer 215 can select the button 1214 ("Estimate my refund status") to view the generated estimate 222 of when the taxpayer 215 can expect to receive the refund 213. FIG. 12B also illustrates that embodiments may be implemented with different computing platforms and devices 1216.

Figure 12C:
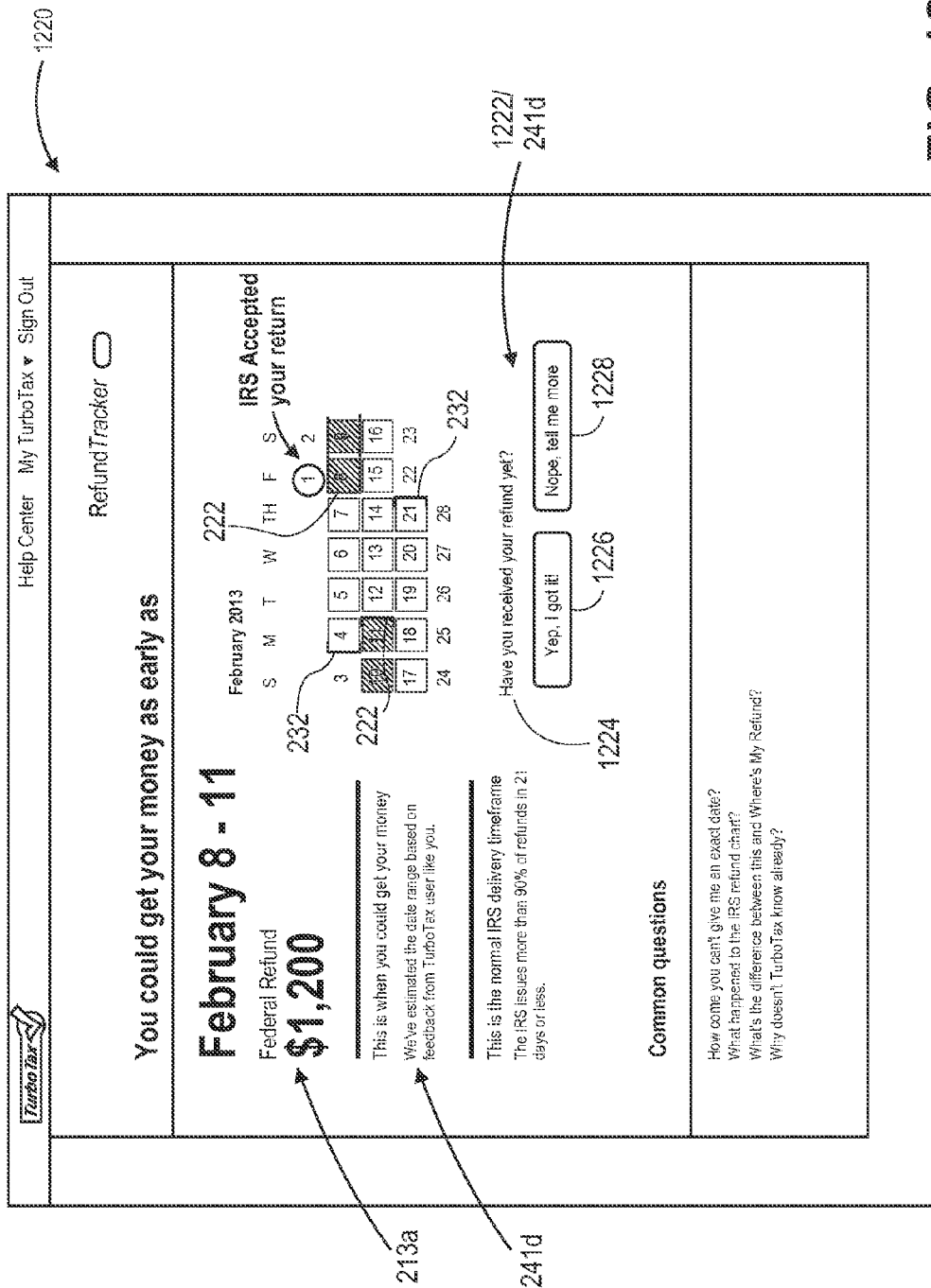

Referring to FIG. 12C, in response to selection of button 1214, if not already performed, the tax preparation application 211 analyzes filing date (February 1) of the electronic tax return 212 and data 241 discussed above (e.g., one or more or all of prior year tax data 241a, current year data 241b, FMS data 241c, social or feedback data 241d, and IRS data 241e) to generate the estimate 222 of when the taxpayer 215 can expect to receive the federal refund 213. In this example, the generated estimate 222 is February 8-11. The generated estimate 222 may be a time or number of days from the current date, a particular date or a range of dates as shown in FIG. 12C.

In the illustrated embodiment, the tax preparation application 211 has also received tax authority data 241d in the form of an estimate 232 by the IRS of when the IRS estimates the taxpayer 215 will receive the refund 213 based on the February 1 filing date. As shown in FIG. 12C, the estimate 222 generated according to embodiments is displayed concurrently with the IRS estimate 232 in a calendar format, or the IRS estimate 232 may be displayed separately as shown in the screen 1230 of FIG. 12D, e.g., in response to a request or selection of a button or link to the IRS estimate 232.

The embodiment illustrated in FIG. 12C also shows the estimate 222 generated according to embodiments overlaps the IRS estimate 232, but this may not always be the case. Further, in the illustrated embodiment, the estimate 222 generated according to embodiments is more focused and spans only four days, whereas the IRS estimate 232 is spans a substantially larger period of time of 18 days. In the embodiment illustrated in FIG. 12C, the screen 1210 indicates that the generated estimate 222 is based at least in part upon social or feedback data 241d from other taxpayers.

Figure 12D:
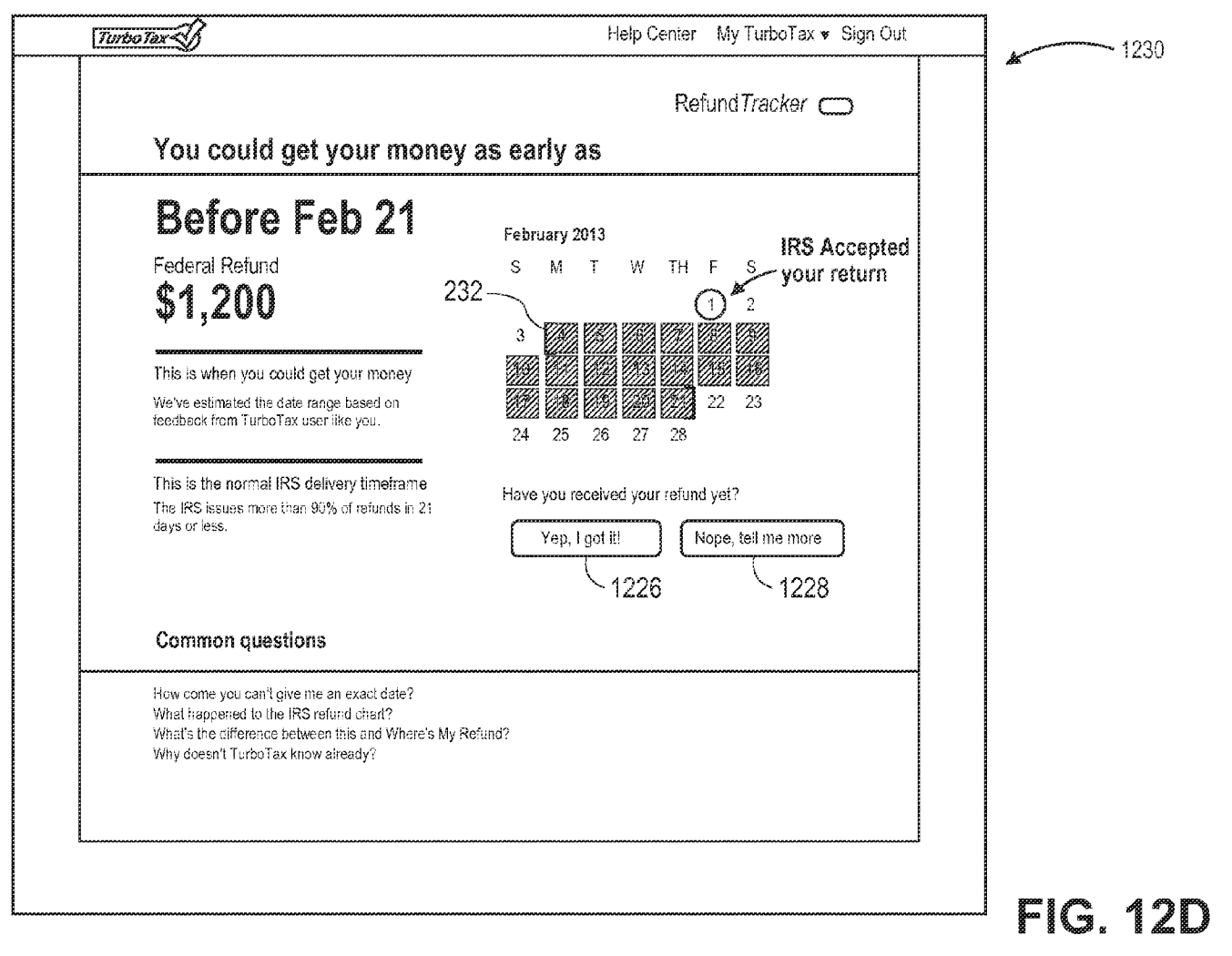

FIGS. 12C-D (and FIG. 12E) also show that the taxpayer 215 can provide 1222 its own feedback data 241d to the tax preparation application 211 to indicate whether or when the taxpayer 215 has received the refund 213. The taxpayer 215 may or may not be informed of the purpose of this feedback 1222. In the illustrated embodiment, the screen 1220 displayed to the taxpayer 215 asks the taxpayer 215 whether the refund 213 has been received 1224 ("Have you received your refund yet?") and provides response options, e.g., in the form of buttons 1226, 1228. Buttons 1226, 1228 can be selected by the taxpayer 215 to indicate whether the refund 213 has been received ("Yep, I got it!") or that the taxpayer 215 is still waiting for the refund ("Nope, tell me more").

Figure 12E:
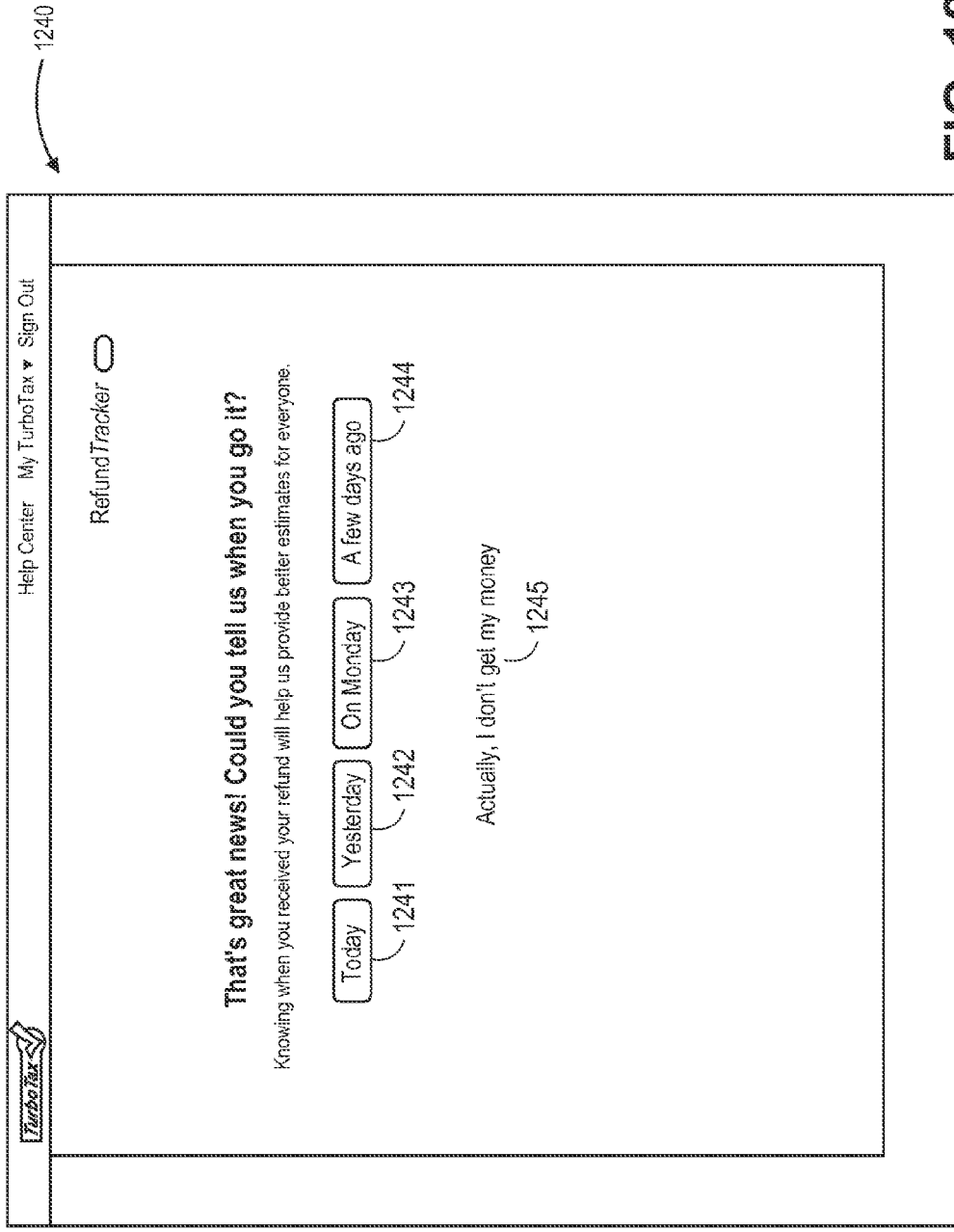

Referring to FIG. 12E, in response to the taxpayer 215 selecting the button 1226 (FIGS. 12C-D) confirming the refund 213 was already received, the tax preparation application 211 may then display a screen 1240 with further questions or input regarding when the refund was received. For this purpose, the screen 1240 may include fields in which the taxpayer 215 can manually enter a date. The screen 1240 may also present a calendar such that the taxpayer 215 can select a date of the calendar. Or, as illustrated in FIG. 12E, the taxpayer 215 may be presented with one or more buttons or pre-determined options 1241-1244 that can be selected to indicate, for example, the taxpayer 215 received the refund "Today," "Yesterday," "On Monday" and "A few days ago." This feedback data 241d can be used to update data store 240 data for that taxpayer 215 and be used in other or future estimate 222 determinations. Further, as such feedback data 241d is received from other taxpayers, a prior generated estimate 222 can be confirmed or updated based at least in part upon actual taxpayer feedback to reflect current wait times and trends. Such confirmations or updates can be performed periodically or in real-time or on-the-fly such that the generated estimates 222 can be confirmed or updated as feedback data 241d and/or other data 241 is received to ensure up to date and accurate estimates 222 of refund wait times. Such confirmations and updates can also be communicated to taxpayers 215 waiting for refunds, e.g., via an electronic mail or SMS message, when a prior estimate sent to the taxpayer has been updated, or updated by a certain number or minimum number of days. For this purpose, the tax preparation application 211 can automatically notify the taxpayer 215 when there is an estimate 222 change or update Referring again to FIGS. 12C-D, and with further reference to FIGS. 12F-G, when the taxpayer 215 indicates that the refund 213 has not been received by selecting another button 1228, 1235 ("Nope, tell me more" button as shown in FIGS. 12C-D, or "Actually, I didn't get my money" button 1245 in FIG. 12E), the tax preparation application 211 can generate a screen 1250, 1260 with a message 1252, 1262 regarding whether the current date is still before the estimated date or range of dates 222 (FIG. 12F) and/or the tax authority estimate 232 (FIG. 12G). In the illustrated example of FIG. 12F in which the electronic tax return 211 was filed on February 1, the generated estimate 222 is February 8-11, and the current date or date of the inquiry is February 8, the tax preparation application 211 may inform the taxpayer (Gloria) that she is still within the estimated range 222 of February 8-11.

Figure 12F:
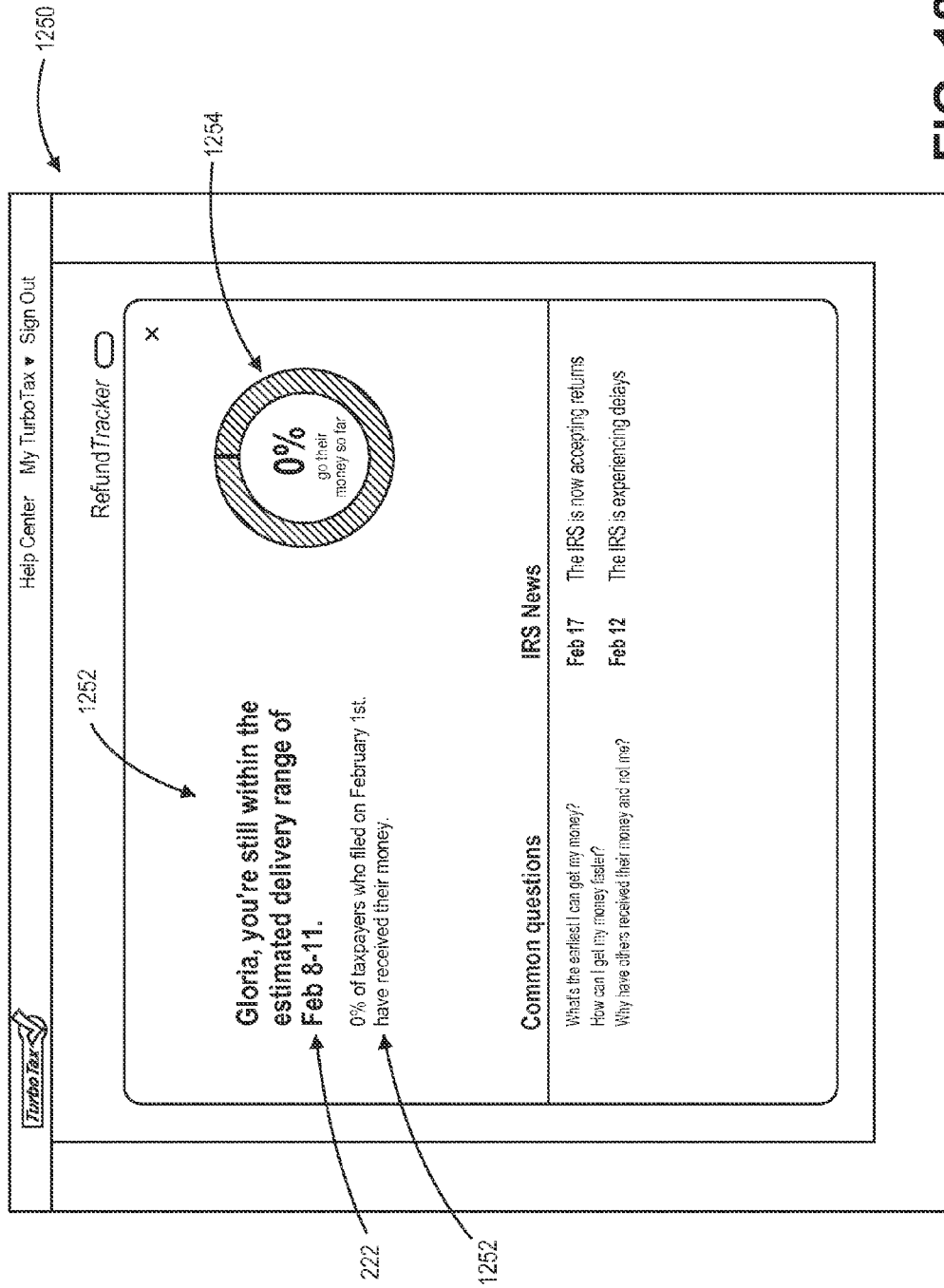
Figure 12G:
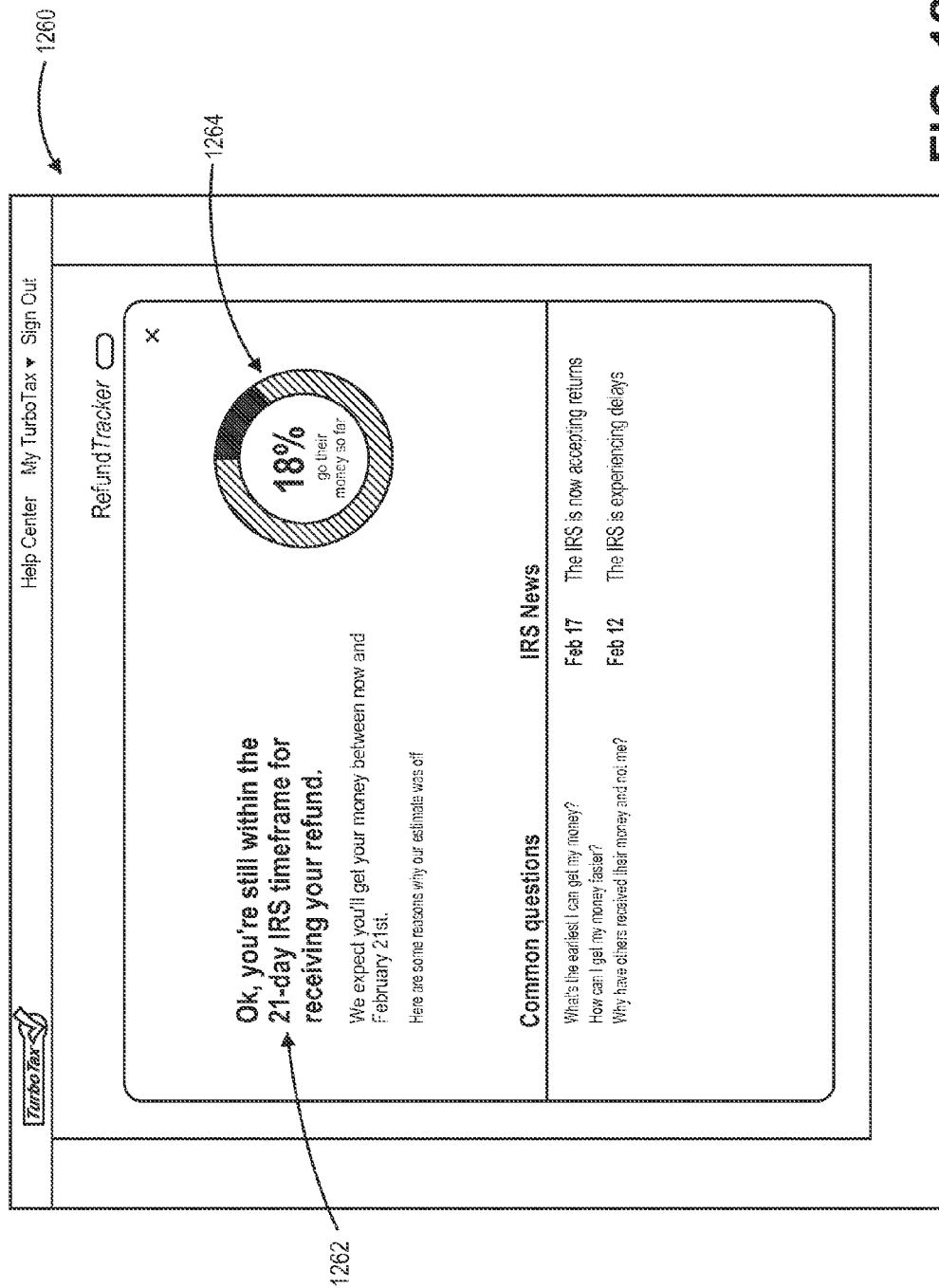
Figure 12H:
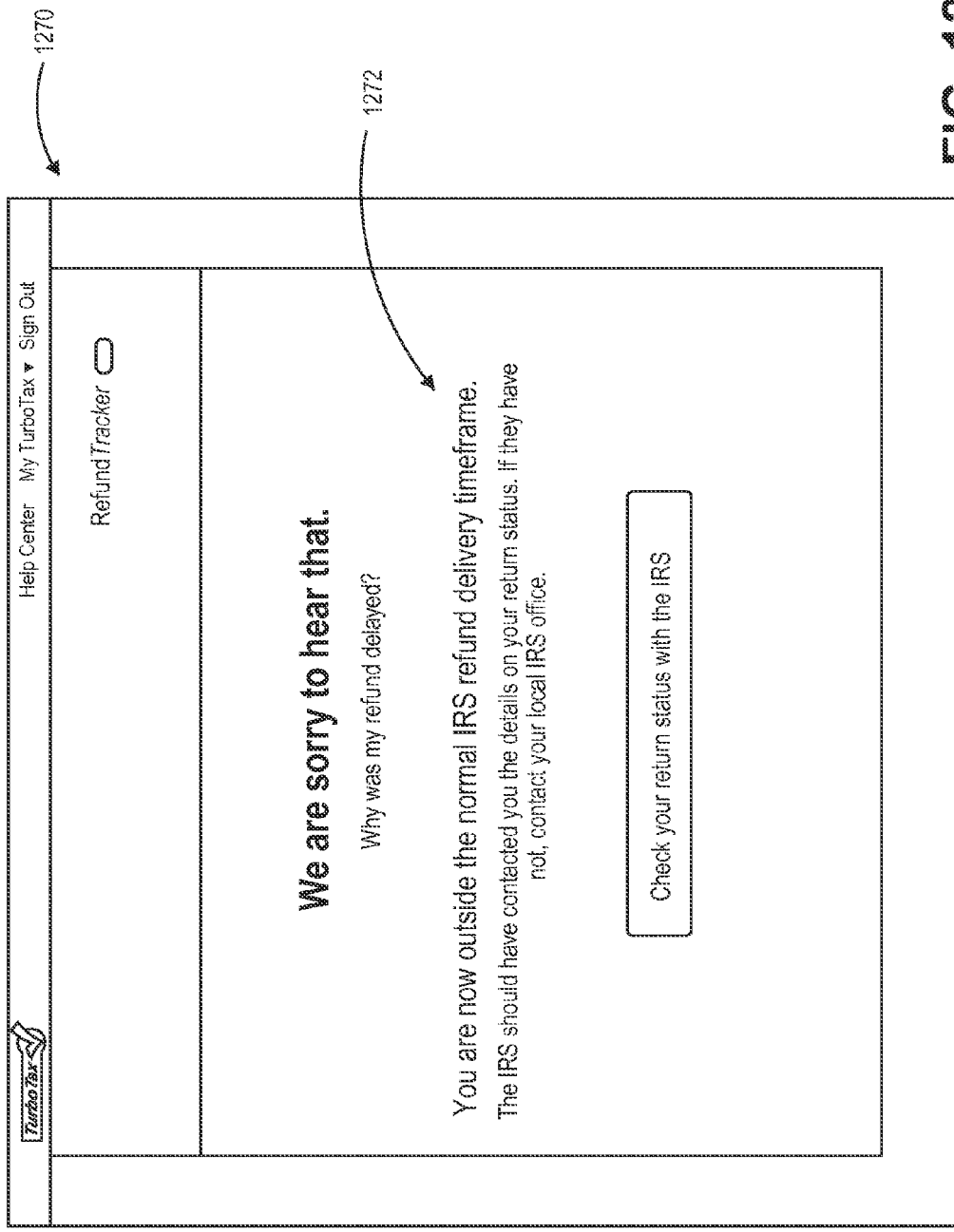

With continuing reference to FIGS. 12F-G, based on the available current year data 241b or sampling, the screens 1250, 1260 may provide additional data 1254, 1264 regarding an estimate of the percentage of other taxpayers that filed their tax returns on the same date (February 1) and have already received their refunds as of the date of the inquiry (February 8).

In the example shown in FIG. 12F, no other taxpayers (as determined by the sample or other data 241) that filed on February 1 have received their refunds as of the current date of February 8, but as more time passes, the tax preparation application 211 becomes aware of refunds, and this percentage is updated.

The determination of the percentage of taxpayers (as shown in FIGS. 12F-G) that filed tax returns on a certain date and have already received refunds may be based on the sampling of tax returns accessible by the tax preparation application 211 and for which information about those refunds has been received, e.g., for refunds processed or routed through the intermediate computer 220, based on other data received or accessed by the intermediate computer 220 and/or other data 241.

Referring to FIG. 12G, in the event that the current date or date of inquiry is beyond the last date of the estimate 222 generated according to embodiments and/or the tax authority estimate 232, the tax preparation application 211 may generate a screen 1270 with a message 1272 informing the taxpayer 215 that the taxpayer 215 is now outside of the estimate range, and should contact the tax authority 235 regarding the refund status.

Figure 13:
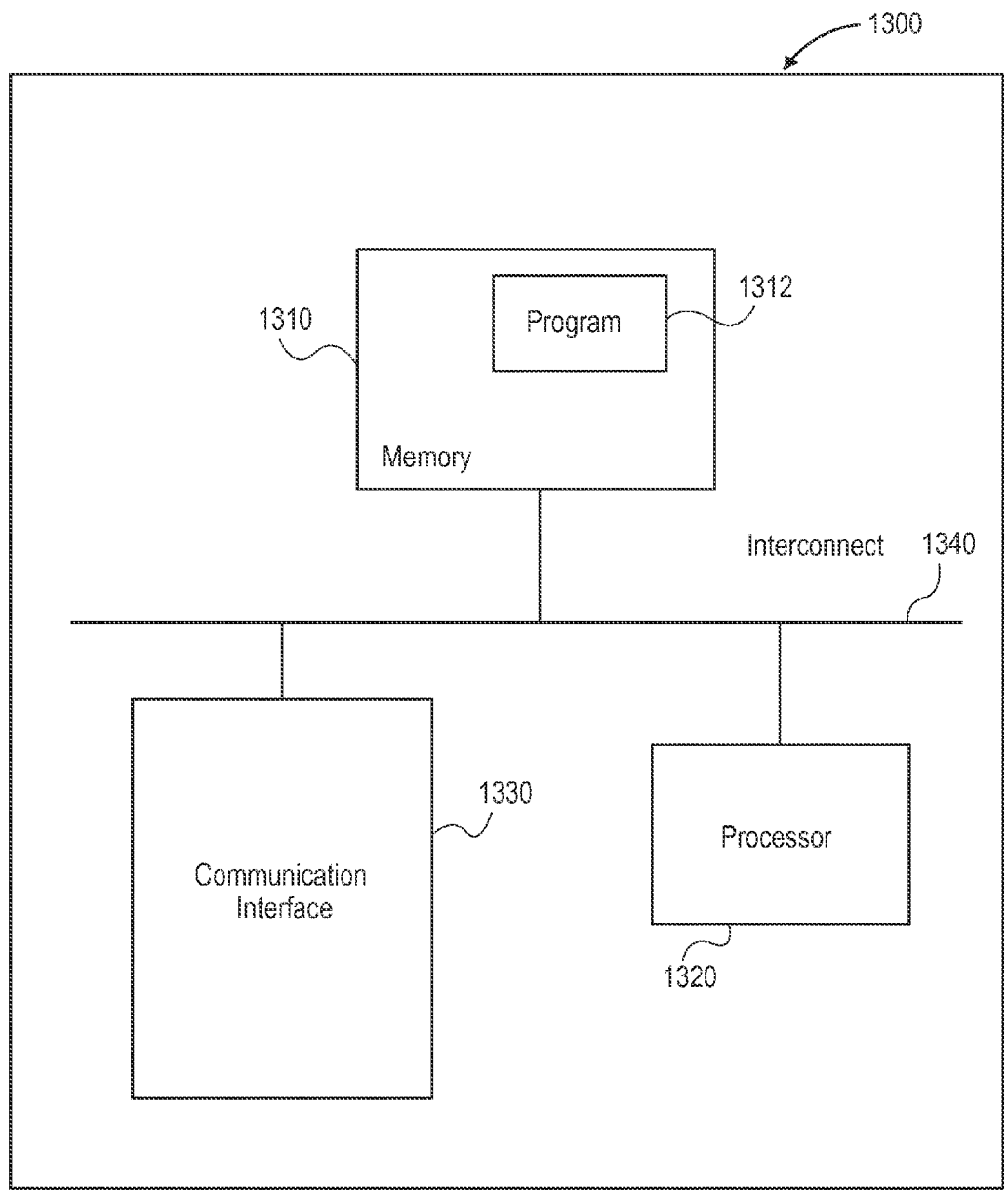
FIG. 13 is a block diagram of components of a computing apparatus or system in which various embodiments may be implemented or that may be utilized to execute various embodiments.

FIG. 13 generally illustrates components of a computing device 1300 that may be utilized to execute embodiments and that includes a memory 1310, account processing program instructions 1312, a processor or controller 1320 to execute account processing program instructions 1312, a network or communications interface 1330, e.g., for communications with a network or interconnect 1340 between such components. The memory 1310 may be or include one or more of cache, RAM, ROM, SRAM, DRAM, RDRAM, EEPROM and other types of volatile or non-volatile memory capable of storing data. The processor unit 1320 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1340 may include a system bus, LDT, PCI, ISA, or other types of buses, and the communications or network interface may, for example, be an Ethernet interface, a Frame Relay interface, or other interface. The network interface 1330 may be configured to enable a system component to communicate with other system components across a network which may be a wireless or various other networks. It should be noted that one or more components of computing device 1300 may be located remotely and accessed via a network. Accordingly, the system configuration provided in FIG. 13 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1320 performs steps or executes program instructions 1312 within memory 1310 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

While certain embodiments are described with reference to preparation of electronic tax returns utilizing tax preparation applications and financial management systems available from Intuit Inc., embodiments may be implemented in or utilize other tax preparation applications and financial management systems, which may execute on the taxpayer's computer, computing apparatus, tablet device or mobile communication device, and may be an on-line tax preparation application or financial management system accessible via a browser.

Embodiments may also involve a taxpayer or user accessing a tax preparation application and receiving or viewing status and estimates regarding when a refund will be received with a desktop or laptop computer, tablet computing or communication device and mobile communication devices such as smartphones.

It will be understood that while embodiments may generate refund estimates independently of tax authority estimates, such estimates may overlap or, in some cases, be the same.

Further, while certain embodiments have been described with reference to a taxpayer logging into a tax preparation application system in order to view or access tax return and refund status, other embodiments may involve updates or messaging to the taxpayer, e.g. as refund date or date ranges are updated, and this may involve electronic messages such as e-mail, text or SMS message and other message formats Further, while certain embodiments are described with reference to a single tax authority, embodiments may be applied to generate estimates regarding when estimates will be received from other and multiple tax authorities. Moreover, such estimates may be based on when a tax return was filed or when a filed tax return was accepted by the tax authority.

While certain examples are provided with reference to analysis of data of different types or sources, the estimator may also utilize a single type of data such as only FMS data, only feedback data, only prior year tax return data, or only data received from another intermediary hosting a temporary account for processing refunds and fee payments. For example, the estimator may analyze prior year tax data to determine when a pre-determined percentage or number (e.g., 80%) of prior year refunds were received. This number of days is utilized to generate an estimate of when a current year taxpayer will receive a refund. If it is determined that 80% or other pre-determined percentage of prior year taxpayer received their refunds within 10-11 days, an estimate for current year taxpayers may be based on the prior year tax data and be 11 days.

While multiple embodiments and variations of the many aspects of the invention have been disclosed and described herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially.

Accordingly, embodiments are intended to exemplify alternatives, modifications, and equivalents that may fall within the scope of the claims.

What is claimed is:

1. A computer-implemented method for estimating when a taxpayer will receive a tax refund, the method being performed by a computer and comprising:
   the computer electronically filing an electronic tax return of the taxpayer with a tax authority, the electronic tax return being generated by a tax preparation application and indicating that the taxpayer will receive a refund from the tax authority;
   the computer receiving first and second data of respective different first and second types, the first data indicating respective times between filing respective prior year tax returns and when respective taxpayers received their respective prior year tax refunds, and the second data indicating respective times between filing respective current year tax returns and when respective taxpayers received their respective current year tax refunds;
   the computer determining respective prior year wait times to receive respective prior year tax refunds and current year wait times to receive respective current year tax refunds based on the first and second data;
   assigning a weighting function to the first data and the second data, the weighting function reflecting reliability or accuracy of the first and second data or sources of the first and second data; and
   the computer generating an estimate of when the taxpayer will receive the refund based at least in part upon the weighting function and the first and second data.

2. The method of claim 1, further comprising transmitting an electronic message comprising the generated estimate to a computing device of the taxpayer.

3. The method of claim 1, further comprising displaying a status of the electronic tax return and the generated estimate to the taxpayer through the tax preparation application when the taxpayer is logged into the tax preparation application.

4. The method of claim 1, wherein
a first weighted value is based at least in part upon the first data; and
a second weighted value is based at least in part upon the second data, the generated estimate being based at least in part upon the first and second weighted values.

5. The method of claim 1, the second data comprising an estimate by the tax authority such that the tax authority estimate is factored into the generated estimate.

6. The method of claim 5, the generated estimate being different than the tax authority estimate.

7. The method of claim 5, the generated estimate being displayed together with the tax authority estimate.

8. The method of claim 1, the generated estimate being based at least in part upon first and second data of respective first and second sources other than the tax authority and being generated independently of an estimate by the tax authority.

9. The method of claim 8, further comprising the computer receiving the tax authority estimate, the generated estimate being displayed together with the tax authority estimate.

10. The method of claim 1, the first data comprising data of prior year tax returns accessible by the tax preparation application and indicating respective times between filing respective prior year tax returns and when respective taxpayers received their respective prior year tax refunds.

11. The method of claim 10, the second data comprising data of current year tax returns accessible by the tax preparation application, the method further comprising the computer:
determining prior year wait times based at least in part upon respective times between filing respective prior year tax returns and when respective taxpayers received their respective prior year tax refunds; and
determining current year wait times based at least in part upon respective times between filing other respective current year tax returns and when respective other taxpayers received their respective current year tax refunds, the generated estimate being based at least in part upon comparing a prior year wait time and a current year wait time.

12. The method of claim 11, further comprising the computer adjusting the generated estimate to a later date when a difference between the prior year wait time and the current year wait time is greater than a pre-determined amount.

13. The method of claim 10, at least one of the first data and the second data comprising feedback from other users of the tax preparation application indicating when the other users received their respective refunds.

14. The method of claim 13, the feedback being provided through the tax preparation application after while users are logged into the tax preparation application to view data concerning their respective tax returns.

15. The method of claim 13, further comprising the computer
requesting feedback from respective other users of the tax preparation application regarding whether the other users have received their respective refunds and when their respective refunds were received when the refunds have been received; and
receiving respective feedback from respective other users.

16. The method of claim 13, the feedback comprising feedback of a taxpayer that received a refund from the tax authority by direct deposit into a designated account of the taxpayer.

17. The method of claim 1, further comprising the computer receiving third data of a third type, the weighting function being assigned to the third data, and the generated estimate being based at least in part upon the weighting function, the first data, the second data and the third data.

18. The method of claim 17, the generated estimate being based at least in part upon the first data, the second data and the third data of respective first, second and third sources other than the tax authority and being generated independently of an estimate by the tax authority.

19. The method of claim 17, the first data comprising data of prior year tax returns indicating respective times between filing respective prior year tax returns and receiving respective prior year tax refunds, the second data comprising data of current year tax returns accessible by the tax preparation application, and the third data comprising feedback by other users of the tax preparation application for the current tax year indicating when the other users received their respective current year refunds.

20. The method of claim 1, the generated estimate being generated independently of an estimate by the tax authority.

21. The method of claim 1, the first data consisting of data of prior year tax returns indicating respective times between filing respective prior year tax returns and receiving respective prior year tax refunds, and the second data consisting of data of current year tax returns indicating when other taxpayers filed their respective other current year tax returns and when the other taxpayers received their respective current year tax refunds.

22. The method of claim 1, the first data consisting of data of prior year tax returns indicating respective times between filing respective prior year tax returns and receiving respective prior year tax refunds, and the second data consisting of feedback by other users of the tax preparation application for the current tax year indicating when the other users received their respective current year refunds.

23. The method of claim 1, the method further comprising the computer
receiving an electronic transfer of the tax refund for a current tax year from a computer of the tax authority;
storing data of when the tax refund was received to a data store;
updating the generated estimate based at least in part upon the stored data; and
providing the updated generated estimate to at least one other taxpayer.

24. The method of claim 23, further comprising the computer transferring the tax refund to the taxpayer.

25. The method of claim 1, at least one of the first data and the second data comprising data received by the computer from a financial management system utilized by at least one other taxpayer and that is in communication with one or more financial institutions at which the at least one other taxpayer has respective one or more accounts including a designated account for receiving an electronic deposit from the tax authority, the financial management system data indicating when the tax refund of the other taxpayer was electronically deposited into the designated account, the generated estimate being based at least in part upon the received financial management system data.

26. The method of claim 25, at least one of the first data and the second data comprising feedback from other users of the tax preparation application indicating when the other users received their respective refunds.

27. The method of claim 1, further comprising the computer generating an estimate of a percentage of taxpayers that filed respective tax returns on a particular date have received their tax refunds on a current date, the percentage estimate being based at least in part upon electronic tax returns that are accessible by the computer.

28. The method of claim 10, the second data comprising data of current year tax returns accessible by the tax preparation application and indicating respective times between filing respective current year tax returns and when respective taxpayers received their respective current year tax refunds.

29. The method of claim 1, the second data comprising data of current year tax returns accessible by the tax preparation application and indicating respective times between filing respective current year tax returns and when respective taxpayers received their respective current year tax refunds.

30. A computer program product comprising a non-transitory computer readable storage medium embodying one or more instructions executable by a computer to perform a process for estimating when a taxpayer will receive a tax refund, the process comprising electronically filing an electronic tax return of the taxpayer with a tax authority, the electronic tax return being generated by a tax preparation application and indicating that the taxpayer will receive a refund from the tax authority; receiving first and second data of respective different first and second types, the first data indicating respective times between filing respective prior year tax returns and when respective taxpayers received their respective prior year tax refunds, and the second data indicating respective times between filing respective current year tax returns and when respective taxpayers received their respective current year tax refunds;

the computer determining respective prior year wait times to receive respective prior year tax refunds and current year wait times to receive respective current year tax refunds based on the first and second data;

assigning a weighting function to the first data and the second data, the weighting function reflecting reliability or accuracy of the first and second data or sources of the first and second data; and generating an estimate of when the taxpayer will receive the refund based at least in part upon the weighting function and the first and second data.

* * * * *